INVENTORS
ARTHUR MOSKOWITZ,
CURTIS W. KOVACH and
RALPH G. WELLS
By
Attorney

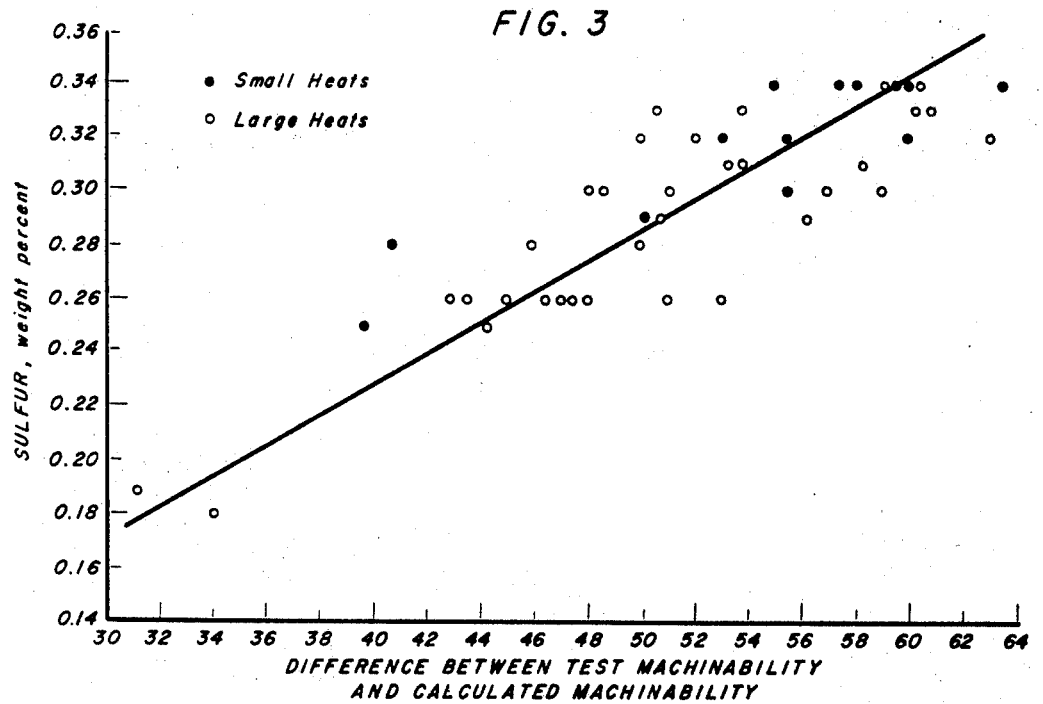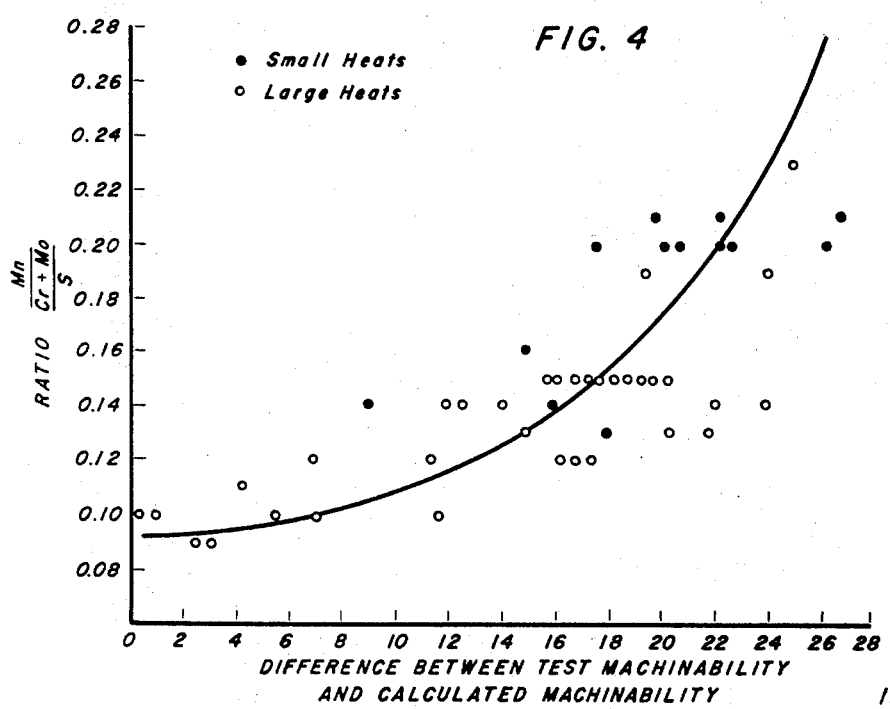

INVENTORS
ARTHUR MOSKOWITZ,
CURTIS W. KOVACH AND
RALPH G. WELLS
By
Attorney

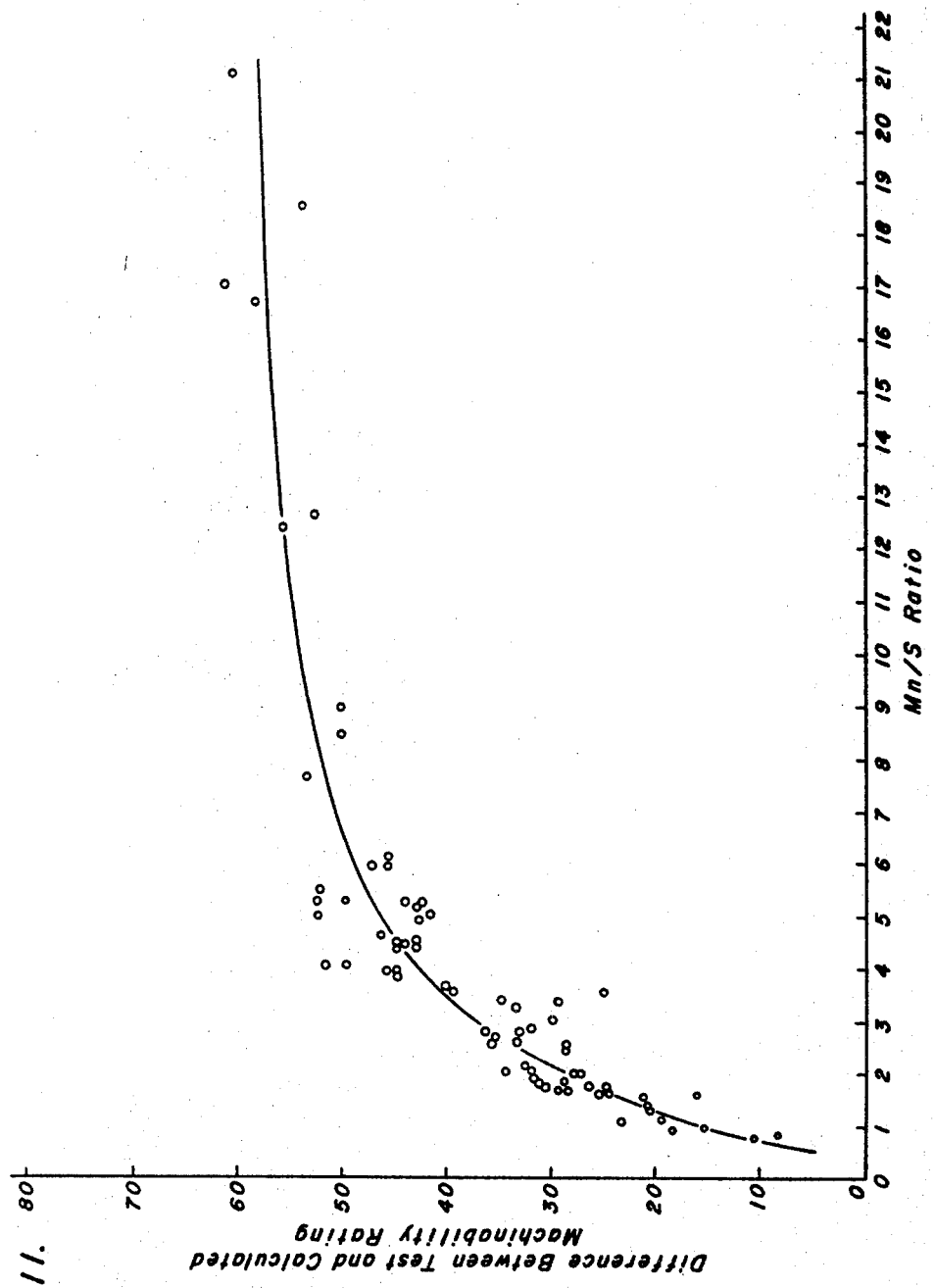

Cast | Forged
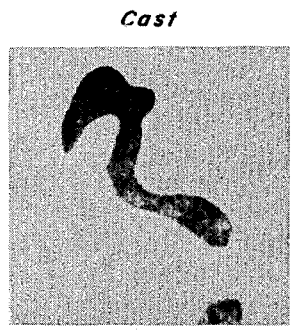 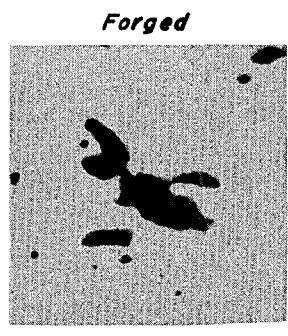
Heat 184
Mn/S = 0.82
(A) (D)
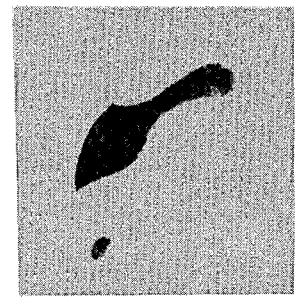 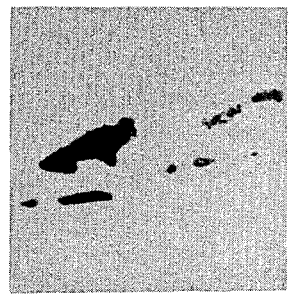
Heat 1189
Mn/S = 1.62
(B) (E)
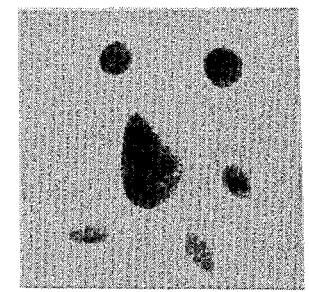 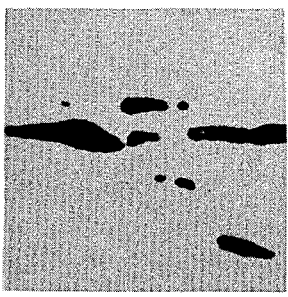
Heat 1191
Mn/S = 3.00
(C) (F)
FIG. 15.

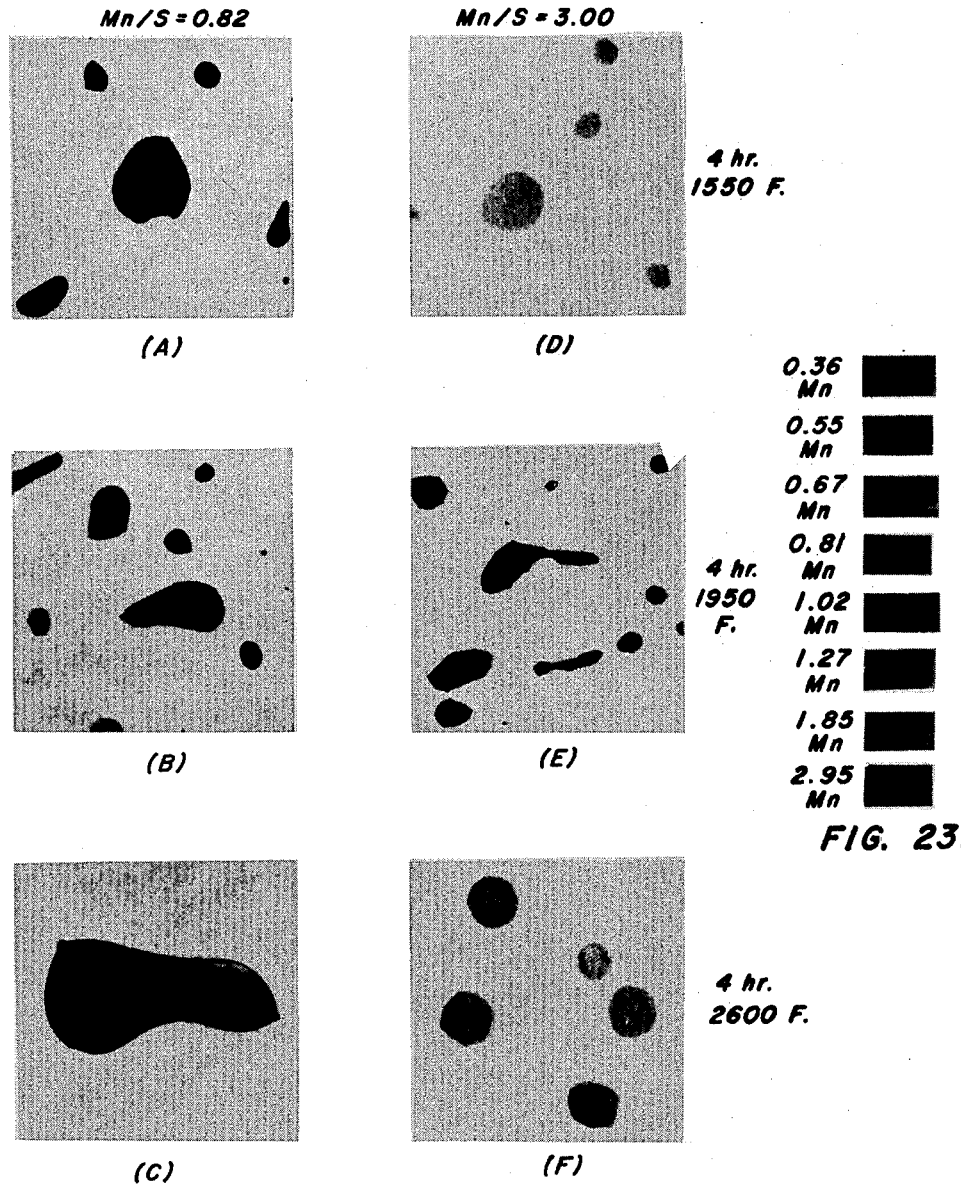

Sept. 10, 1968    A. MOSKOWITZ ET AL    3,401,035
FREE-MACHINING STAINLESS STEELS
Filed Dec. 7, 1967    17 Sheets-Sheet 13

INVENTORS
ARTHUR MOSKOWITZ
CURTIS W. KOVACH AND
RALPH G. WELLS
By
John R. Pegan
Attorney Sept. 10, 1968     A. MOSKOWITZ ET AL     3,401,035

FREE-MACHINING STAINLESS STEELS

Filed Dec. 7, 1967     17 Sheets-Sheet 14

INVENTORS
ARTHUR MOSKOWITZ
CURTIS W. KOVACH AND
RALPH G. WELLS

By John R. Pegan
Attorney

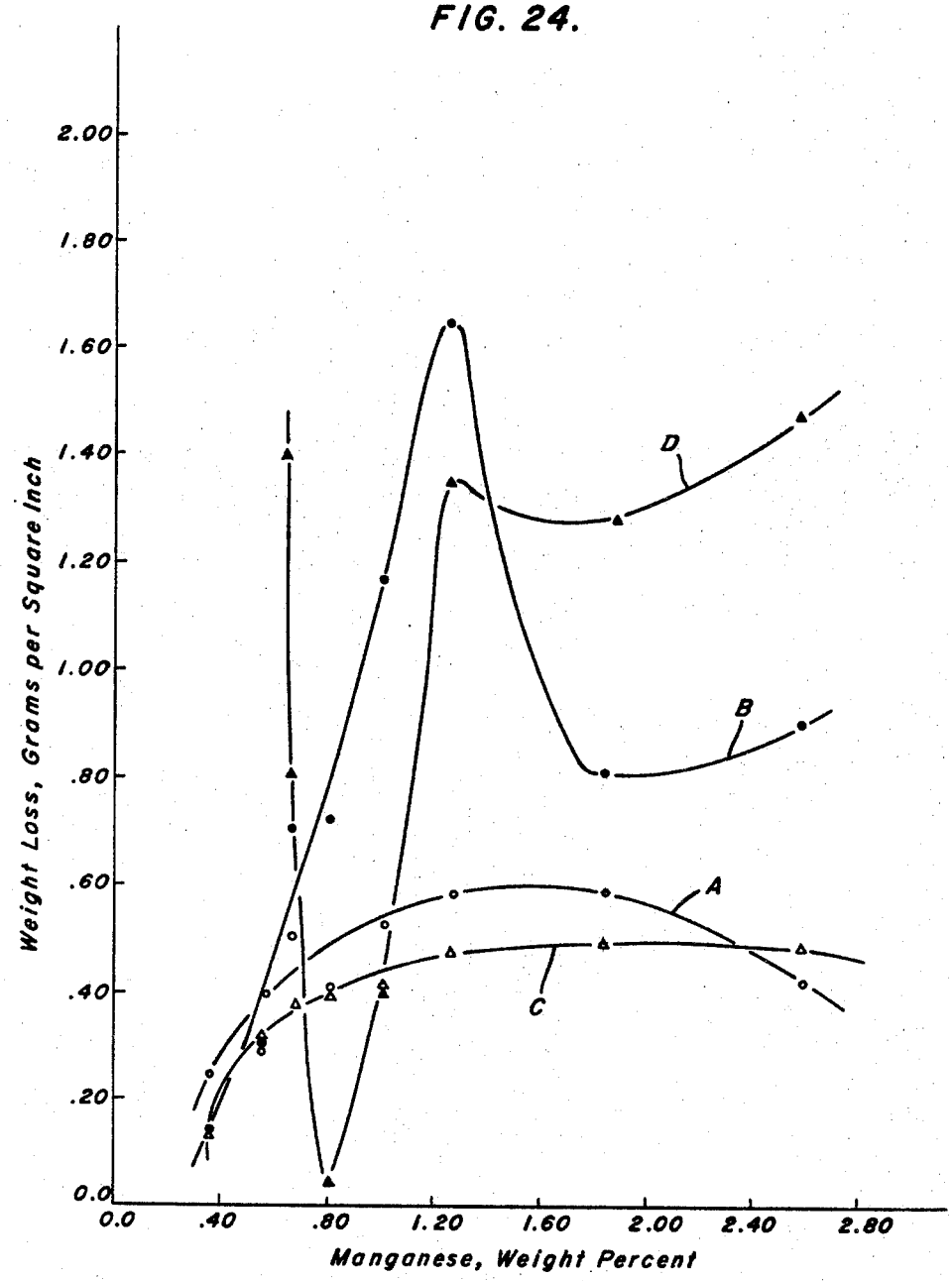

United States Patent Office 3,401,035
Patented Sept. 10, 1968

3,401,035
FREE-MACHINING STAINLESS STEELS
Arthur Moskowitz, Curtis Walter Kovach, and Ralph Gordon Wells, Pittsburgh, Pa., assignors to Crucible Steel Company of America, Pittsburgh, Pa., a corporation of New Jersey
Continuation-in-part of applications Ser. No. 472,756, July 6, 1965, and Ser. No. 556,056, June 8, 1966. This application Dec. 7, 1967, Ser. No. 693,044
7 Claims. (Cl. 75—126)

ABSTRACT OF THE DISCLOSURE

This invention concerns stainless steels having improved physical properties, most notably significantly improved machinability. Specifically, it has been found that stainless steels containing from 11 to 30 weight percent chromium, balance substantially all iron, except for impurities and minor amounts of alloying elements, are vastly improved in machinability if amounts of manganese ranging from 0.80 to 4.0 weight percent are added to the steel in conjunction with sulfur in amounts ranging from 0.18 to about 0.50 weight percent. The amounts of manganese and sulfur added within these stated ranges should be such that the manganese to sulfur ratio is between 3 to 1 and 10 to 1.

---

This is a continuation-in-part of our copending applications Ser. No. 472,756, filed on July 6, 1965 now abandoned, and Ser. No. 556,056, filed on June 8, 1966 now abandoned, said former application being a continuation-in-part of application Ser. No. 422,155, filed Dec. 30, 1964 (now abandoned).

The AISI "400" series of stainless steels are straight chromium steels for general purpose applications requiring good corrosion resistance due, of course, to the relatively high chromium contents thereof. All of these straight chromium steels can be forged and machined, but some are relatively more forgeable or relatively more machinable than others. Machinability of stainless steels is an essential characteristic in a wide variety of end use applications, and certain of the stainless steels of the prior art have been devised with enhanced machinability particularly in mind. For example, AISI Type 416 stainless steel, containing, generally, 0.15% maximum carbon, 1.25% maximum manganese, 1.0% maximum silicon, about .06% phosphorus, 0.60% maximum molybdenum or zirconium, about 12 to 14% chromium, balance iron, contains a sulfur addition of about 0.15% minimum in order to take advantage of the well-known property of sulfur in machinability enhancement. Steels such as Type 416 are hardenable steels having a martensitic microstructure, and which contain optional additions of molybdenum or zirconium, which are generally viewed as having a beneficial effect, respectively, upon corrosion resistance and hot workability.

For many applications requiring extensive mechanical working, including machining, it is necessary that such stainless steels be amenable to annealing to a low hardness level of about 200 Brinell Hardness Number (BHN). Steels such as Type 416 are heat treatable to increased hardness levels; and this hardening characteristic is, of course, quite important in many applications where the end use requires an alloy of relatively high hardness. Heat treated hardnesses of about 370 BHN are commonly attainable in such prior art steels.

As a consequence of the wide and increasing variety of required end use applications, the prior art has provided a host of variations in the basic stainless steel compositions, wherein the properties of the steels are varied, by compositional alterations and processing factors, to suit the specific steel for a particular desired use. Special emphasis has been placed by the prior art upon the enhancement of machinability of stainless steels, for example, by the addition of various quantities of sulfur and, in the case of some steels, by alteration of their microstructures, for example, by a particular balance of alloying elements and by special heat treatment. As a consequence, the steel-producing industry provides chromium stainless steels having fully martensitic structures, others with fully ferritic structures, as well as steels having a "duplex" structure, i.e., one containing a mixture of martensite and ferrite—the latter phase, being softer than martensite, adding substantially to the machinability of such steels as compared to steels of a martensitic nature. However, such microstructural alterations are accompanied by unavoidable property changes such as decreases in the maximum attainable hardness after heat treatment. Moreover, the addition of free-machining additives, such as sulfur, deleteriously affects other steel properties such as corrosion resistance, machined surface quality and forgeability.

Therefore, it is an object of the present invention to provide new chromium-containing stainless steels having enhanced machinability properties.

It is another object of the invention to provide new and improved methods for enhancing the machinability of stainless steels.

It is a particular object of the invention to provide new and improved straight chromium stainless steels having greatly enhanced machinability.

The foregoing and other objects of the invention will become more readily apparent by an inspection of the following detailed description and the accompanying drawings wherein.

Figure 6:
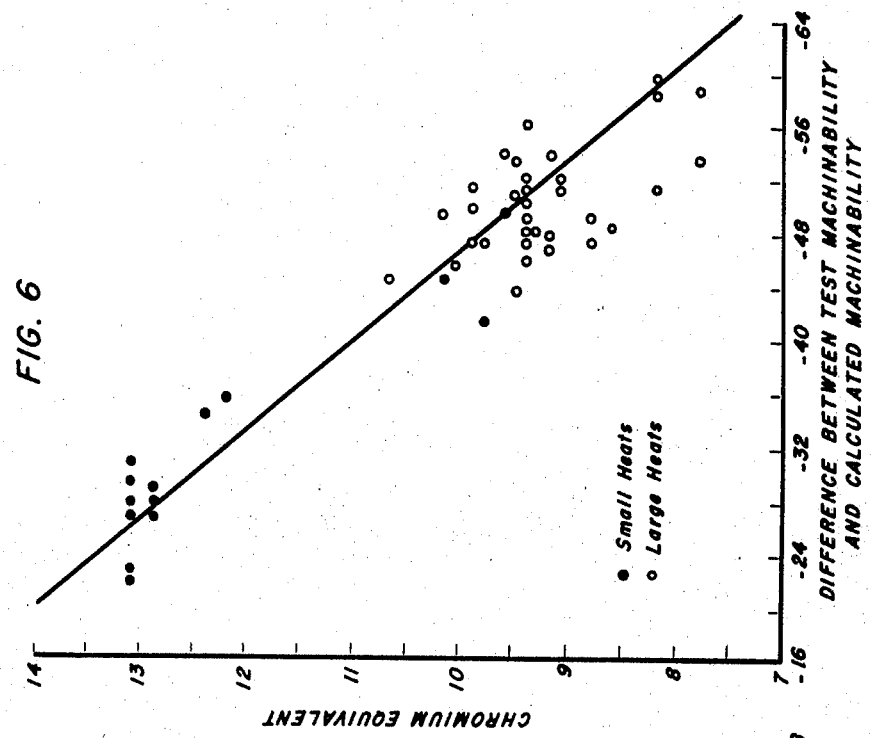
Figure 5:
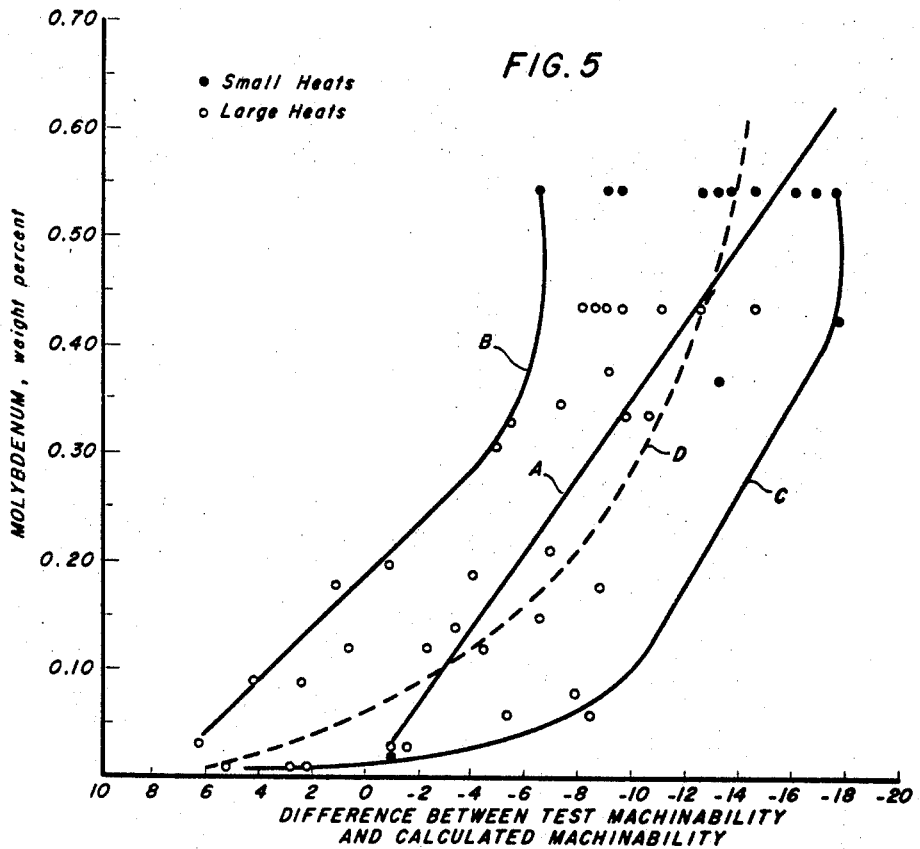
Figure 12:
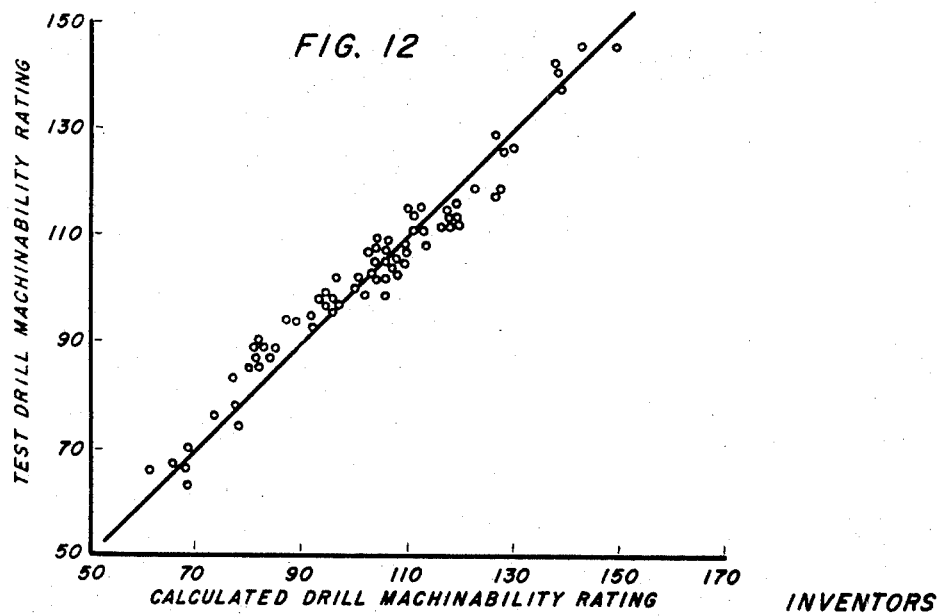
Figure 7:
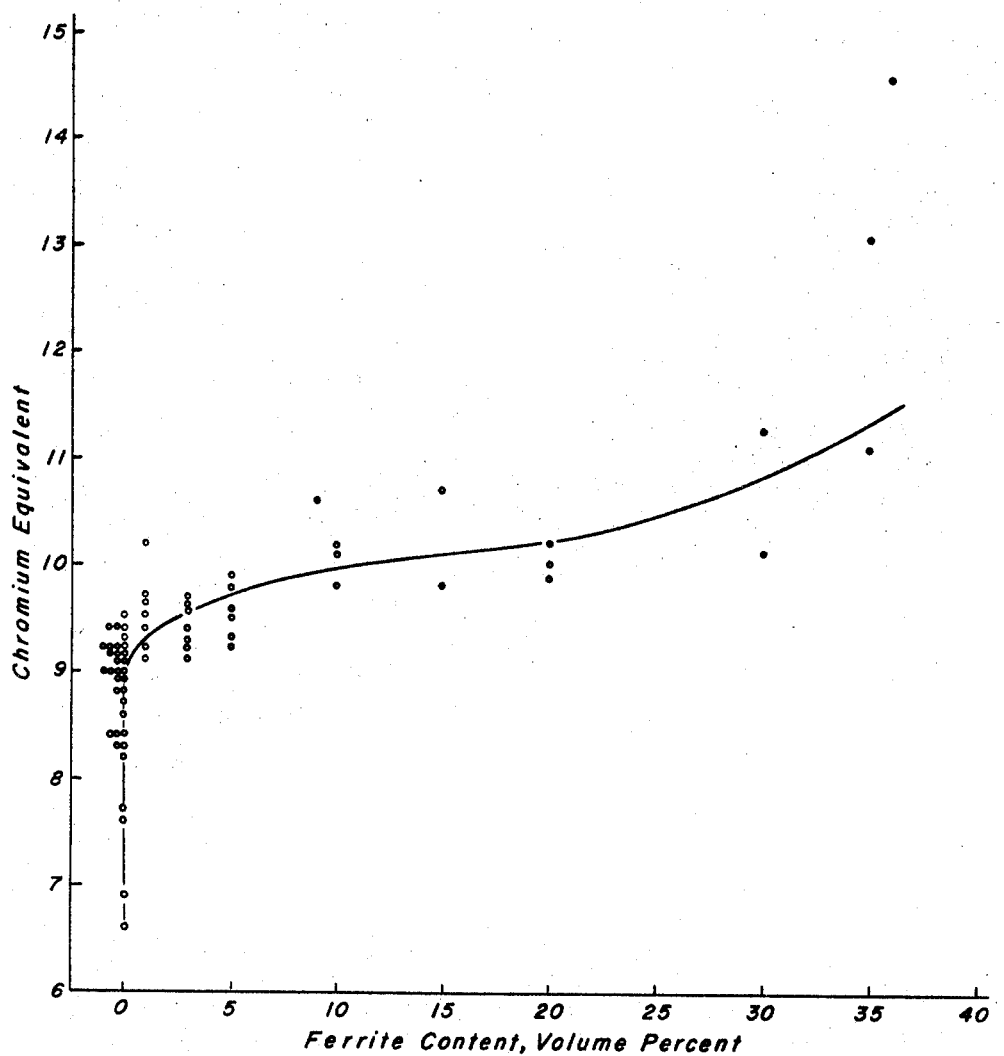
Figure 8:
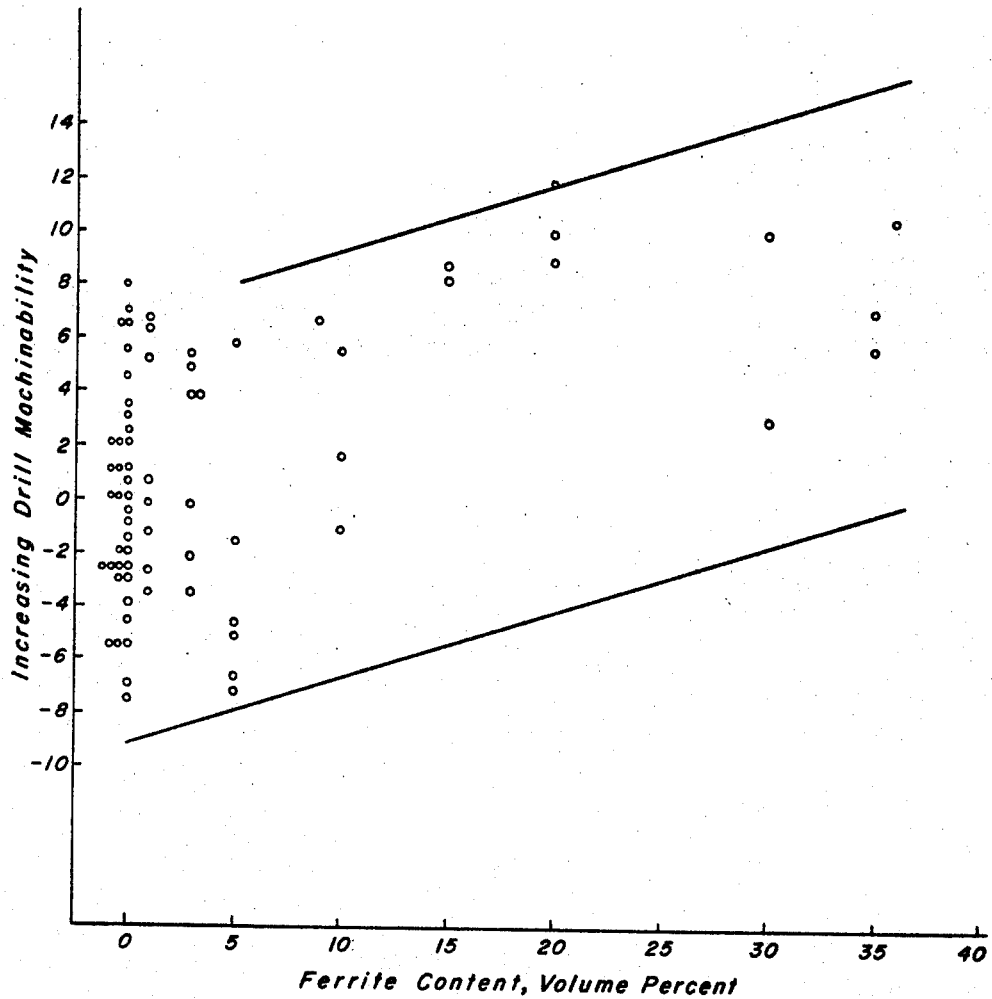
Figure 9:
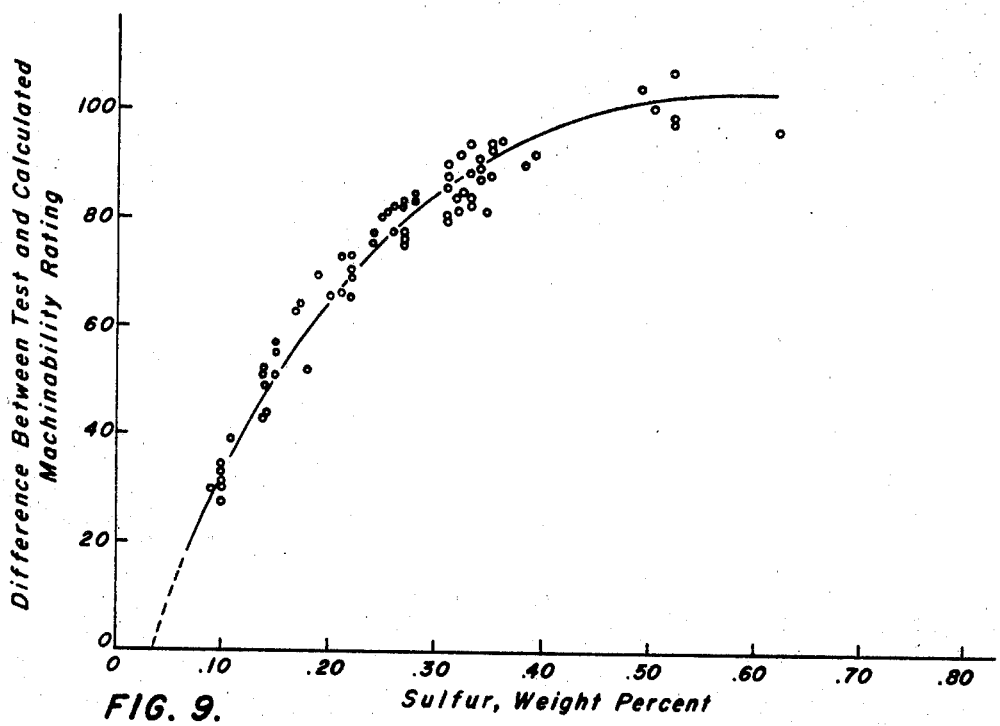
Figure 10:
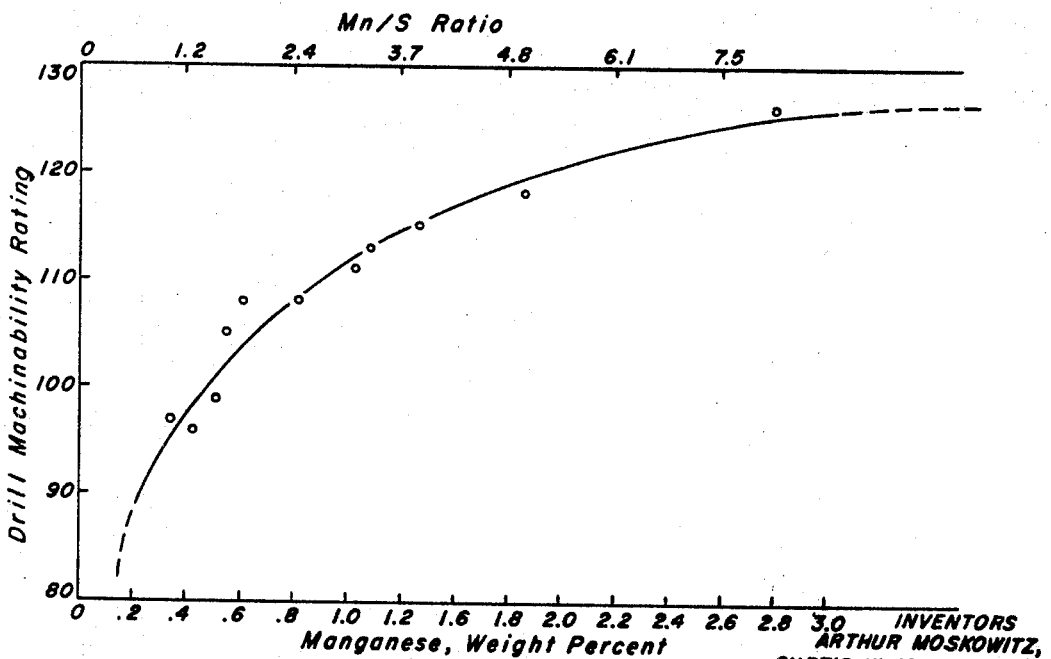
Figure 13:
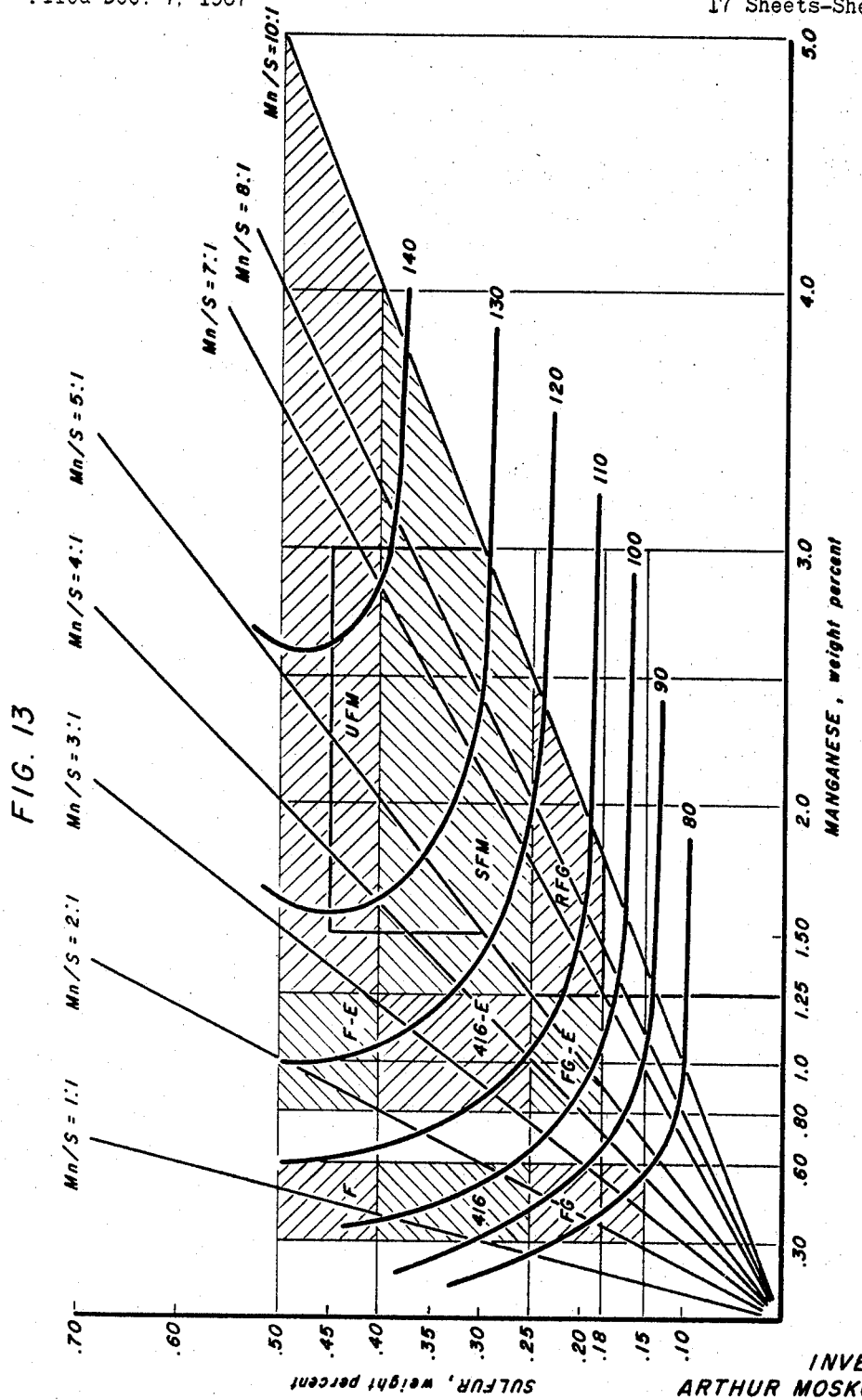

FIGURE 3 graphically depicts the relationship between sulfur content of chromium stainless steels and the difference between test and calculated machinability thereof;

FIGURE 4 is a graphical representation relating the difference between test and calculated machinability to the combined effect of manganese, chromium, molybdenum and sulfur contents of chromium stainless steels;

FIGURE 5 is a graphical representation of the effect of molybdenum content of chromium stainless steels upon the machinability thereof, expressed as the difference between test and calculated machinability values;

FIGURE 6 graphically relates the relationship between machinability, expressed as the difference between test and calculated machinability, of chromium-containing stainless steels and the "chromium equivalent" (as hereinafter defined) thereof;

FIGURE 7 graphically illustrates the relationship between chromium equivalent and ferrite content in tested chromium stainless steels;

FIGURE 8 is illustrative of the relationship between ferrite content and drill machinability of tested chromium stainless steels;

FIGURE 9 is a graphical representation of the relationship between the sulfur content and machinability, expressed as difference between actual and calculated machinability, of a second series of test alloys of the straight chromium variety;

FIGURE 10 is a graph relating manganese content and drill machinability rating for a part of the aforesaid second series of test compositions;

FIGURE 11 graphically relates the manganese-sulfur ratio to the difference between test and calculated machinability of the said second series of test alloys;

FIGURE 12 is a graphical representation of the correlation between calculated and test drill machinability rating for the tested steel compositions;

FIGURE 13 is a graph relating manganese content, sulfur content and machinability of the second series of tested alloys.

Figure 17:
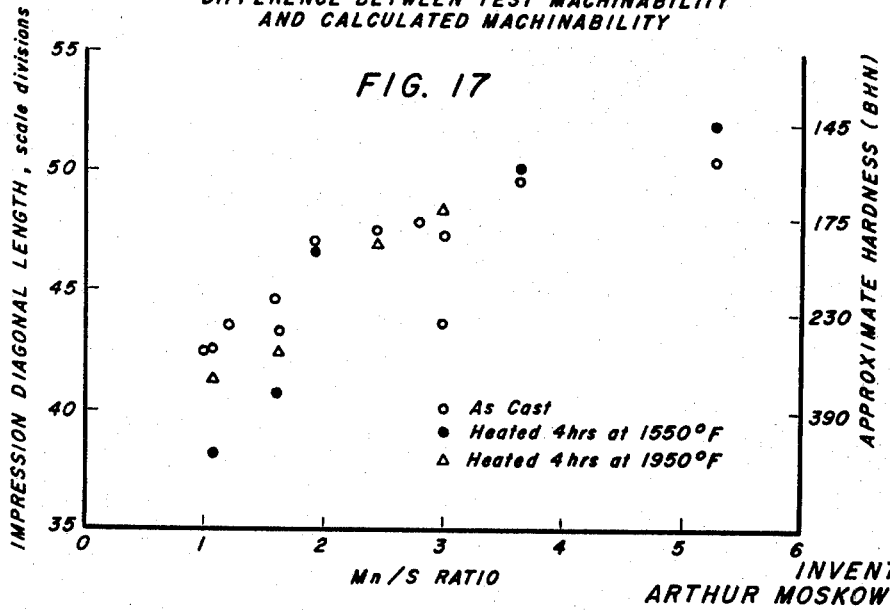
Figure 14:
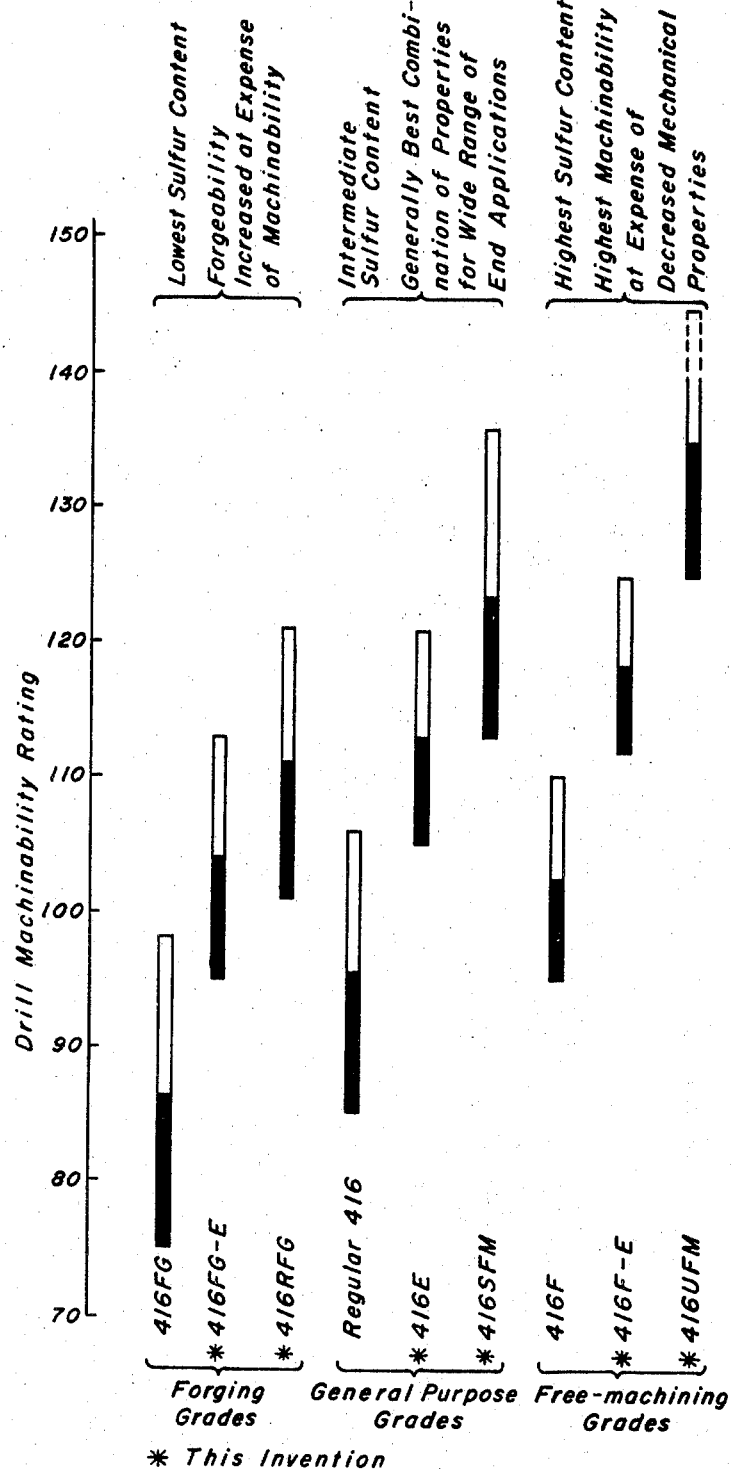
Figure 18:
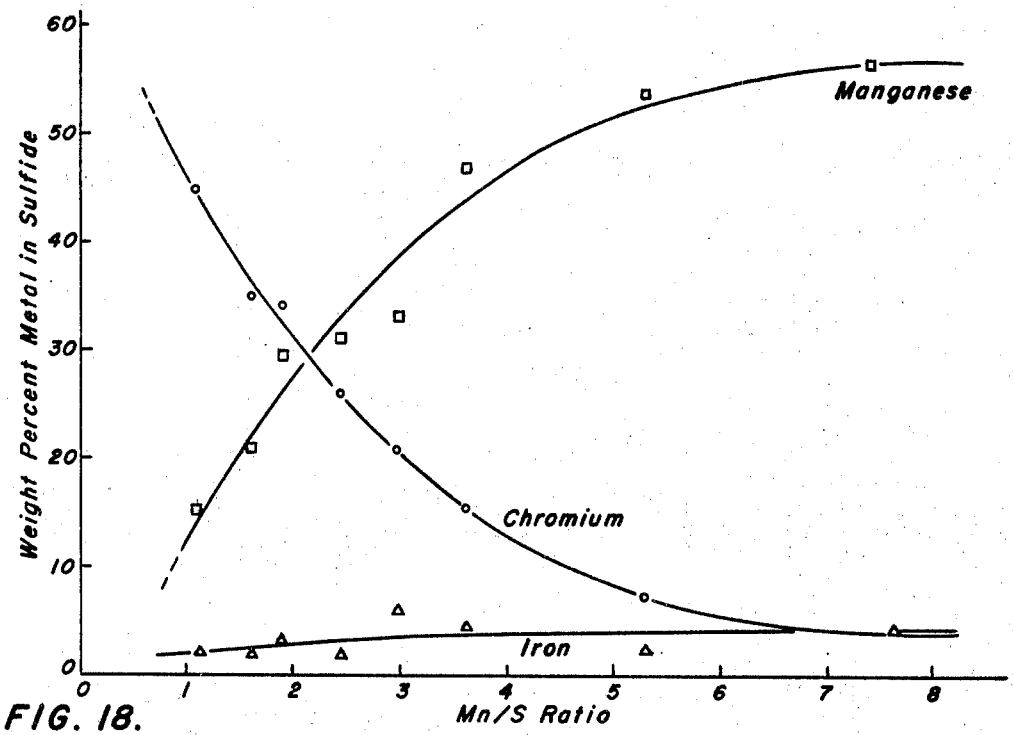
Figure 19:
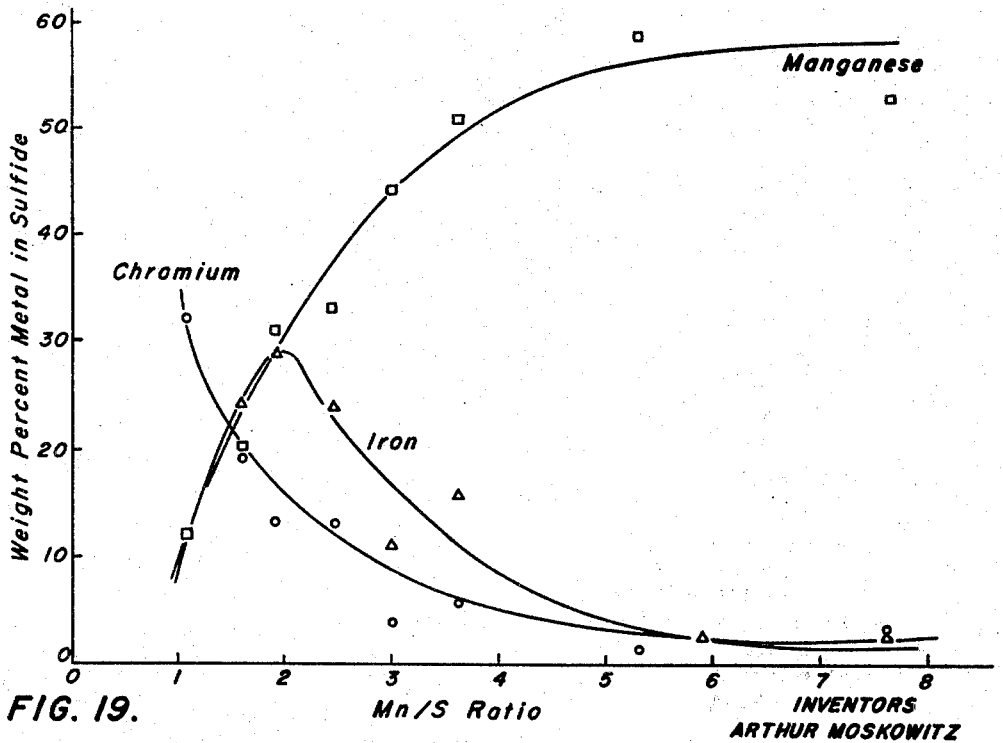
Figure 20:
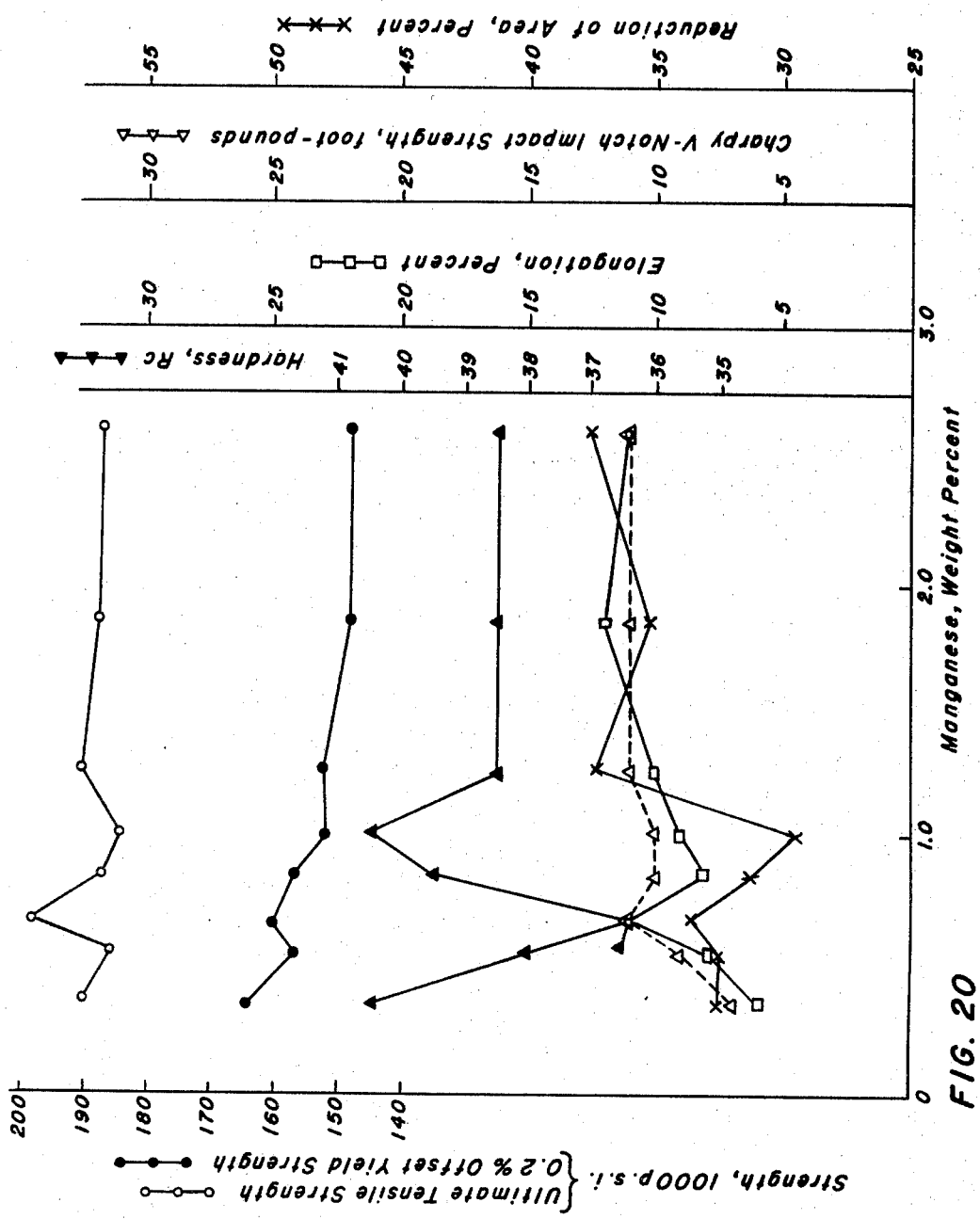
Figure 21:
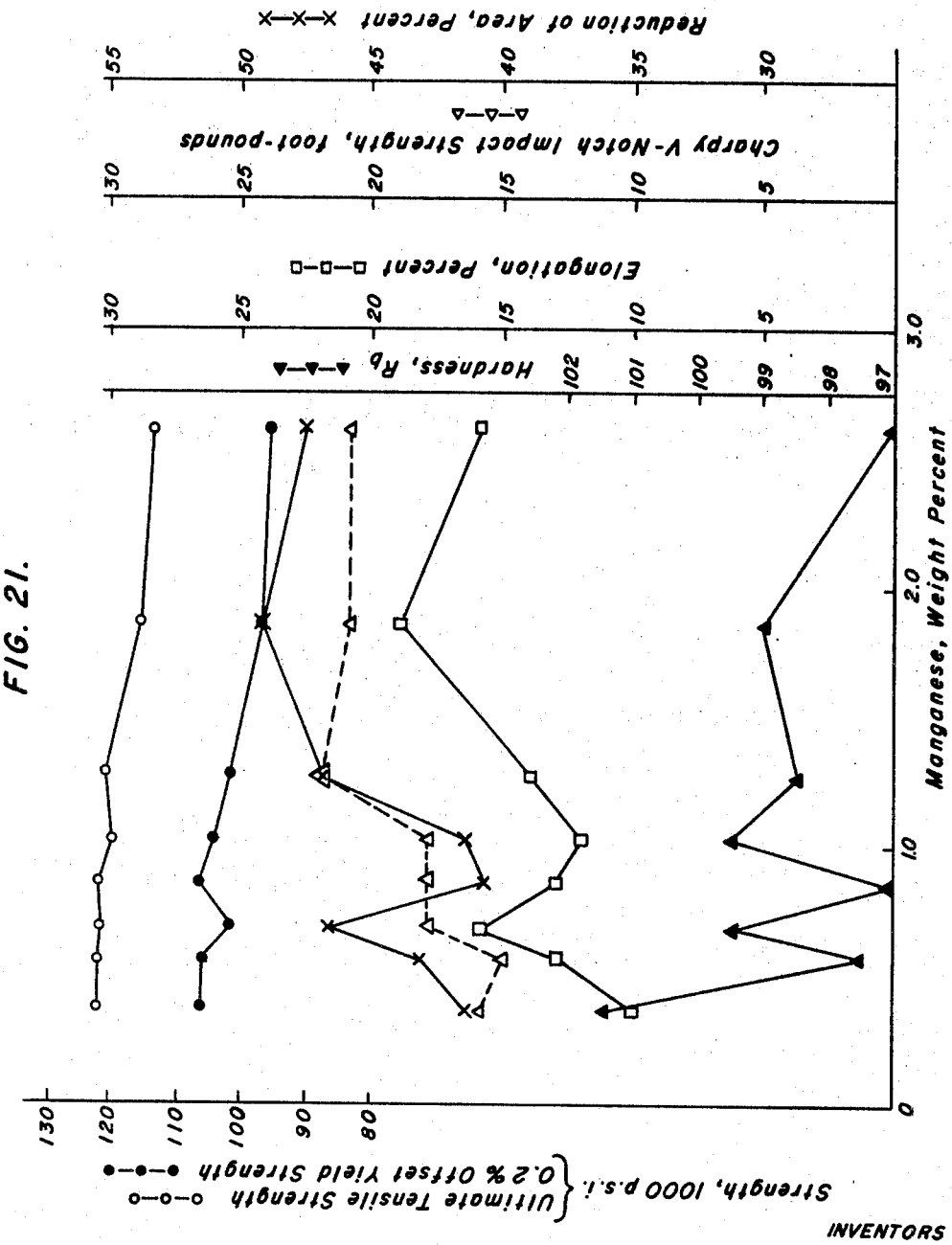
Figure 22:
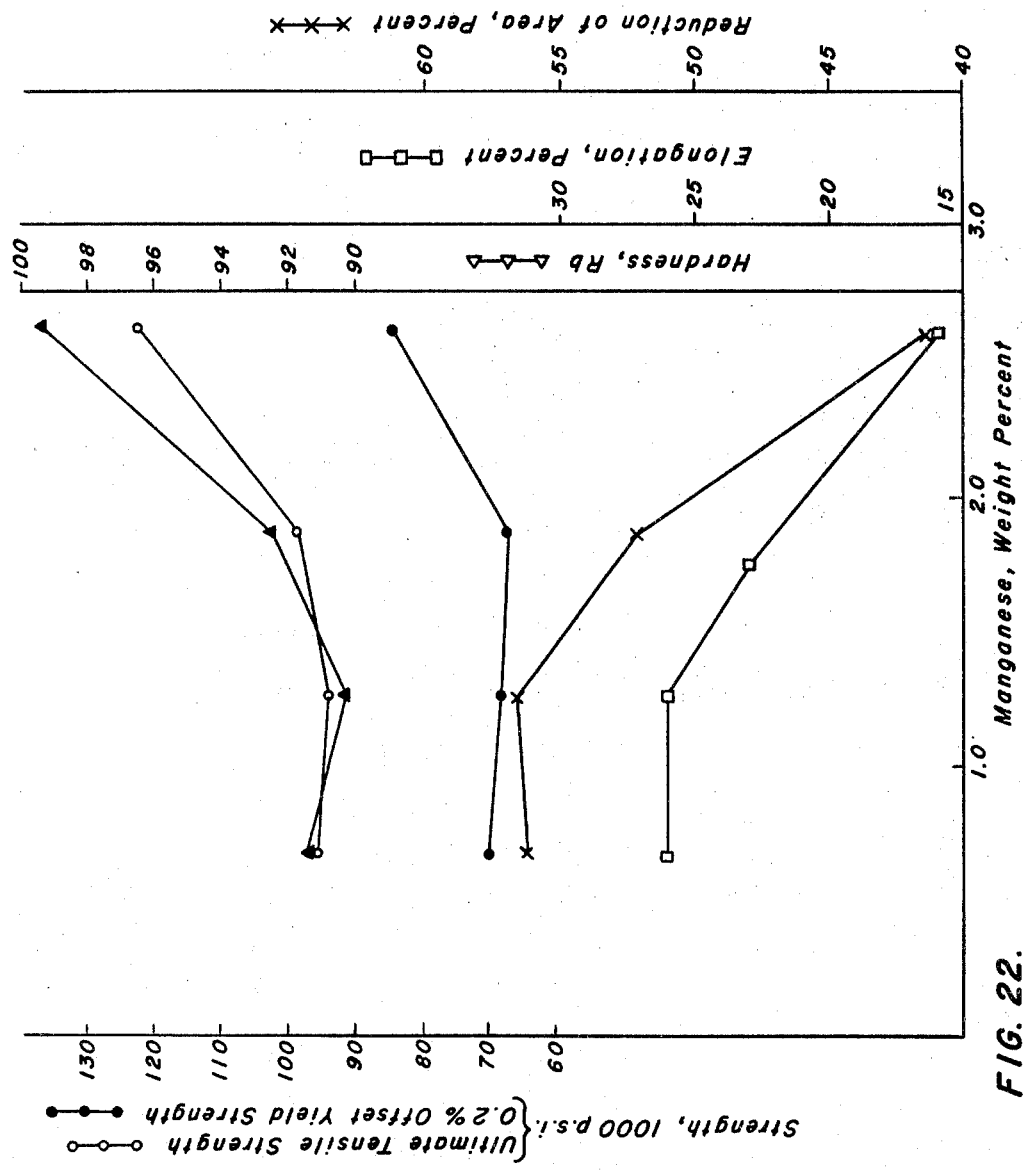

FIGURE 14 is a bar graph illustrating the relationship between machinabilities of certain prior art straight chromium stainless steels and those of this invention;

FIGURES 15A–F are photomicrographic reproductions illustrative of sulfide inclusions in cast and forged heats of straight chromium stainless steels having various manganese-sulfur ratios;

FIGURES 16A–F are photomicrographic reproductions illustrative of the effect of heating on sulfide inclusions in ingots of straight chromium stainless steel compositions of both low and high manganese-sulfur ratios;

FIGURE 17 is a graphical representation of the relationship between the manganese-sulfur ratio of as-cast and heat-treated straight chromium stainless steel compositions and the hardness (expressed as the impression diagonal length) of sulfide inclusions therein;

FIGURE 18 is a graphical representation of the relationship between the manganese-sulfur ratio of tested straight chromium stainless steels, in an as-cast condition, and the composition of sulfide inclusions therein, in terms of iron, chromium and manganese contents thereof;

FIGURE 19 graphically represents the relationship between the manganese-sulfur ratios of tested chromium stainless steels, in wrought condition, and the percent metal in sulfide inclusions therein, expressed as the chromium, iron and manganese contents thereof;

FIGURES 20–22 graphically relate the manganese content of the second series of tested stainless steels with ultimate tensile strength, offset yield strength, hardness, elongation, reduction of area and impact strength—under different heat-treated conditions of the steels so tested;

FIGURE 23 is a photographic representation of the results of exposure of several steel test samples, of varying manganese contents, to a water vapor corrosion test; and FIGURE 24 is a graphical representation of the effect of manganese content of tested steel compositions upon weight loss thereof under several severely corrosive environmental conditions.

Broadly, the stainless steel of this invention has about, in weight percent, 11 to 30 chromium, up to 1.2 carbon, up to 0.60 or less than 0.35 molybdenum plus zirconium, up to 1.0 silicon, 0.18 to 0.50 or 0.40 sulfur, 0.80 to 4.0 manganese, up to 3.0 nickel and the balance iron, except for incidental impurities; the manganese to sulfur ratio of the steel is between about 3 to 1 and about 10 to 1. The upper carbon limit may be 0.20 or 0.15 percent when chromium is within the range of about 11 to 15 percent. The preferred upper limit for manganese in promoting machinability is 2.5 percent. Manganese may be present within the ranges of 1.20 to 4.0 percent, .80 to 1.25 percent, over 1.25 to 2.5 percent, and over 1.25 to 5.0 percent. Chromium contents within the range of 15 to 20 may be used for purposes of obtaining a ferritic stainless steel; for purpose of steel having a low ferrite content, chromium within the range of 11 to 15 percent may be used. For optimum machinability sulfur may be present within the range of 0.35 to 0.50 percent.

As indicated hereinabove, improvements have previously been made by the prior art in the machinability of chromium-containing stainless steels by a close control of the amounts and relative proportions of the various alloying elements present in the steel as well as by variations in heat treatment thereof during processing. Accordingly, an analysis was undertaken of the effect upon machinability of the several alloying constituents of a generally 416 type stainless steel. For this purpose, a first series of 48 heats were manufactured and evaluated, these heats having compositions as given in Table I.

TABLE I

| Heat Number | Sample Number | Melt | Composition | | | | | | | | | | Standard Test Bar Number | Hardness BHN | Test Machinability | Calculated Machinability |
|---|---|---|---|---|---|---|---|---|---|---|---|---|---|---|---|---|
| | | | C | Mn | P | S | Si | Ni | Cr | Mo | Cu[1] | Ti | | | | |
| E133469 | 1 | Large | 0.10 | 0.80 | 0.021 | 0.28 | 0.40 | 0.25 | 11.89 | 0.35 | 0.076 | 0.001 | 214 | 228 | 100 | 100.0 |
| 93546 | 2 | Small | 0.041 | 0.50 | 0.005 | 0.28 | 0.46 | 0.01 | 12.80 | 0.43 | 0.07 | | 214 | 156 | 104 | 111.5 |
| 93547 | 3 | do | 0.051 | 0.53 | 0.008 | 0.25 | 0.50 | 0.01 | 13.14 | 0.37 | 0.07 | 0.03 | 214 | 159 | 104 | 108.0 |
| 93548 | 4 | do | 0.111 | 0.53 | 0.007 | 0.29 | 0.44 | 0.01 | 13.12 | 0.02 | 0.07 | | 214 | 176 | 100 | 100.5 |
| 93549 | 5 | do | 0.105 | 0.53 | 0.007 | 0.30 | 0.45 | 0.01 | 12.90 | 0.33 | 0.07 | | 214 | 185 | 98 | 95.0 |
| 93440–2 | 6 | do | 0.130 | 1.03 | | 0.29 | 0.55 | 0.06 | 12.76 | 0.54 | (0.10) | | 214 | 195 | 104 | 97.5 |
| 93503–1 | 7 | do | 0.061 | 1.03 | | 0.34 | 0.47 | 0.58 | 14.58 | 0.55 | (0.10) | 0.01 | 364 | 237 | 115 | 111.0 |
| 93503–2 | 8 | do | 0.079 | 1.03 | | 0.34 | 0.52 | 0.59 | 14.66 | 0.55 | (0.10) | 0.07 | 364 | 214 | 116 | 115.5 |
| 93503–3 | 9 | do | 0.072 | 1.03 | | 0.32 | 0.47 | 0.60 | 14.54 | 0.55 | (0.10) | 0.15 | 364 | 205 | 115 | 115.5 |
| 93503–1 | 10 | do | 0.061 | 1.03 | | 0.34 | 0.47 | 0.58 | 14.58 | 0.55 | (0.10) | 0.01 | 364 | 205 | 114 | 118.5 |
| 93503–2 | 11 | do | 0.079 | 1.03 | | 0.34 | 0.52 | 0.59 | 14.66 | 0.55 | (0.10) | 0.07 | 364 | 205 | 116 | 117.5 |
| 93503–3 | 12 | do | 0.072 | 1.03 | | 0.32 | 0.47 | 0.60 | 14.54 | 0.55 | (0.10) | 0.15 | 364 | 190 | 116 | 119.0 |
| 93503–1 | 13 | do | 0.061 | 1.03 | | 0.34 | 0.47 | 0.58 | 14.58 | 0.55 | (0.10) | 0.01 | 364 | 185 | 121 | 123.0 |
| 93503–2 | 14 | do | 0.079 | 1.03 | | 0.34 | 0.52 | 0.59 | 14.66 | 0.55 | (0.10) | 0.07 | 364 | 180 | 123 | 123.0 |
| 93503–3 | 15 | do | 0.072 | 1.03 | | 0.32 | 0.47 | 0.60 | 14.54 | 0.55 | (0.10) | 0.15 | 364 | 176 | 126 | 122.0 |
| 55893 | 16 | Large | 0.133 | 0.38 | 0.014 | 0.33 | 0.29 | 0.37 | 12.48 | 0.01 | (0.10) | | 214 | 172 | 98 | 97.0 |
| 55888 | 17 | do | 0.106 | 0.45 | 0.013 | 0.33 | 0.44 | 0.11 | 12.98 | 0.06 | (0.10) | 0.04 | 214 | 213 | 95 | 103.0 |
| 124942 | 18 | do | 0.12 | 0.51 | 0.017 | 0.26 | 0.27 | 0.47 | 13.03 | 0.44 | (0.10) | | 214 | 244 | 85 | 83.5 |
| 124942 | 19 | do | 0.12 | 0.51 | 0.017 | 0.26 | 0.27 | 0.47 | 13.03 | 0.44 | (0.10) | | 214 | 255 | 85 | 84.0 |
| 124942 | 20 | do | 0.12 | 0.51 | 0.017 | 0.26 | 0.27 | 0.47 | 13.03 | 0.44 | (0.10) | | 214 | 193 | 94 | 98.0 |
| 124942 | 21 | do | 0.12 | 0.51 | 0.017 | 0.26 | 0.27 | 0.47 | 13.03 | 0.44 | (0.10) | | 214 | 195 | 95 | 97.5 |

See footnote at end of table.

TABLE I—Continued

| Heat Number | Sample Number | Melt | Composition | | | | | | | | | | Standard Test Bar Number | Hardness BHN | Test Machinability | Calculated Machinability |
|---|---|---|---|---|---|---|---|---|---|---|---|---|---|---|---|---|
| | | | C | Mn | P | S | Si | Ni | Cr | Mo | Cu[1] | Ti | | | | |
| 124942 | 22 | do | 0.12 | 0.51 | 0.017 | 0.26 | 0.27 | 0.47 | 13.03 | 0.44 | (0.10) | | 214 | 221 | 92 | 92.0 |
| 124942 | 23 | do | 0.12 | 0.51 | 0.017 | 0.26 | 0.27 | 0.47 | 13.03 | 0.44 | (0.10) | | 214 | 221 | 93 | 92.0 |
| 55520 | 24 | do | 0.095 | 0.48 | 0.016 | 0.25 | 0.38 | 0.28 | 12.81 | 0.19 | 0.10 | | 214 | 225 | 97 | 97.5 |
| 44364 | 25 | do | 0.100 | 0.50 | 0.019 | 0.29 | 0.42 | 0.35 | 12.99 | 0.38 | 0.12 | | 214 | 234 | 96 | 97.0 |
| 55508 | 26 | do | 0.107 | 0.47 | 0.016 | 0.26 | 0.49 | 0.24 | 12.80 | 0.18 | 0.09 | | 214 | 247 | 96 | 91.5 |
| 45961 | 27 | do | 0.127 | 0.49 | 0.016 | 0.29 | 0.62 | 0.36 | 12.90 | 0.01 | 0.01 | | 214 | 224 | 104 | 99.5 |
| 45691 | 28 | do | 0.117 | 0.41 | 0.017 | 0.30 | 0.43 | 0.48 | 12.93 | 0.09 | 0.15 | | 214 | 202 | 100 | 94.5 |
| 45639 | 29 | do | 0.122 | 0.58 | 0.018 | 0.26 | 0.50 | 0.47 | 12.97 | 0.10 | 0.17 | | 214 | 217 | 103 | 96.5 |
| 45867 | 30 | do | 0.091 | 0.45 | 0.015 | 0.34 | 0.55 | 0.42 | 12.84 | 0.12 | 0.11 | | 214 | 235 | 99 | 99.5 |
| 54648 | 31 | do | 0.106 | 0.47 | 0.021 | 0.30 | 0.52 | 0.50 | 13.05 | 0.34 | 0.19 | | 214 | 209 | 97 | 99.5 |
| 45883 | 32 | do | 0.110 | 0.48 | 0.017 | 0.34 | 0.48 | 0.40 | 12.83 | 0.14 | 0.12 | | 214 | 253 | 94 | 95.0 |
| 45805 | 33 | do | 0.101 | 0.49 | 0.015 | 0.32 | 0.35 | 0.34 | 12.85 | 0.08 | 0.16 | | 214 | 216 | 100 | 107.0 |
| 45944 | 34 | do | 0.090 | 0.58 | 0.018 | 0.28 | 0.56 | 0.42 | 12.84 | 0.15 | 0.15 | | 214 | 231 | 100 | 104.0 |
| 45767 | 35 | do | 0.103 | 0.45 | 0.017 | 0.30 | 0.31 | 0.36 | 12.83 | 0.09 | 0.08 | | 214 | 239 | 100 | 96.5 |
| 44424 | 36 | do | 0.092 | 0.47 | 0.018 | 0.18 | 0.34 | 0.42 | 13.21 | 0.31 | 0.11 | | 214 | 229 | 91 | 89.5 |
| 45967 | 37 | do | 0.112 | 0.50 | 0.018 | 0.31 | 0.53 | 0.35 | 12.86 | 0.20 | 0.12 | | 214 | 227 | 103 | 101.5 |
| 45803 | 38 | do | 0.107 | 0.46 | 0.017 | 0.30 | 0.32 | 0.30 | 12.82 | 0.12 | 0.13 | | 214 | 225 | 102 | 99.5 |
| E124853 | 39 | do | 0.130 | 0.60 | 0.021 | 0.32 | 0.46 | 0.42 | 13.18 | 0.44 | 0.12 | | 214 | 221 | 96 | 101.0 |
| 45312 | 40 | do | 0.091 | 0.48 | 0.017 | 0.26 | 0.42 | 0.32 | 13.12 | 0.34 | 0.12 | | 214 | 233 | 95 | 98.5 |
| 55592 | 41 | do | 0.102 | 0.56 | 0.018 | 0.30 | 0.42 | 0.22 | 13.00 | 0.18 | 0.07 | | 214 | 226 | 100 | 105.5 |
| 55893 | 42 | do | 0.133 | 0.38 | 0.014 | 0.33 | 0.29 | 0.37 | 12.48 | 0.01 | (0.10) | | 214 | 192 | 99 | 92.0 |
| 55888 | 43 | do | 0.106 | 0.45 | 0.013 | 0.33 | 0.44 | 0.11 | 12.98 | 0.06 | (0.10) | 0.04 | 214 | 197 | 101 | 106.0 |
| 55743 | 44 | do | 0.114 | 0.48 | 0.017 | 0.19 | 0.26 | 0.33 | 12.96 | 0.21 | 0.09 | | 214 | 222 | 84 | 87.0 |
| 25329 | 45 | do | 0.127 | 0.54 | 0.012 | 0.32 | 0.30 | 0.39 | 12.49 | 0.03 | (0.10) | 0.06 | 214 | 238 | 103 | 97.0 |
| 25330 | 46 | do | 0.125 | 0.58 | 0.012 | 0.31 | 0.37 | 0.38 | 12.43 | 0.02 | (0.10) | 0.04 | 214 | 216 | 102 | 103.5 |
| 25330 | 47 | do | 0.125 | 0.58 | 0.012 | 0.31 | 0.37 | 0.38 | 12.43 | 0.02 | (0.10) | 0.04 | 214 | 210 | 102 | 104.0 |
| 55752 | 48 | do | 0.109 | 0.47 | 0.016 | 0.31 | 0.95 | 0.31 | 12.87 | 0.16 | 0.07 | | 214 | 234 | 90 | 94.0 |

[1] Parentheses indicate that no analysis was made and that the amount was estimated.

The heats of Table I were prepared in the form of relatively large, commercial-size heats of about 30,000 pounds per heat (denoted as "large" in Table I) or smaller, laboratory-size heats of about fifty pounds each (designated as "small" in Table I).

In the case of the larger heats, the steel was cast into 12-inch square ingot molds whereas the smaller heats were cast into 12-pound ingots. The cast ingots were forged to bar form, at least one bar from each heat was selected, the hardness thereof determined, as given in Table I, by standard measurement techniques, and each bar was then subjected to a drill machinability test, with results as set forth in Table I. In each case, the drill machinability value was determined by comparison with a standard AISI Type 303 stainless steel composition in bar form (Bar Nos. 214 and 364). Bar No. 364 had a rating of 99 when compared with Bar 214—to which a rating of 100 was assigned. Therefore, the test bars which were compared with Bar 364 as a standard were increased in rating by one point in order to make all test comparisons uniform. The drill test was made in a direction perpendicular to the longitudinal axis of the bar. A vertical drill press was utilized and operated at a uniform speed of 460 r.p.m. A 26-pound weight was suspended from a 7-inch lever arm to provide a constant load on a ¼-inch diameter drill. Twelve 0.400-inch holes were made with three different drills to evaluate each test specimen. The typical drilling time for the standard bar was 14.5 seconds, and for most test bars the drilling time ranged between 11 and 18 seconds. The drill machinability was calculated by striking a ratio between the standard bar drilling time and the test bar drilling time and multiplying by 100. Accordingly, test bars with good drill machinability showed a drilling time less than the standard and therefore have a drill rating greater than 100.

In order to evaluate the effect of chemical and hardness variations upon machinability, the drill machinability rating was considered as the dependent variable whereas chemistry and hardness were considered as independent variables, whereby correlation of drill machinability with steel composition may be described by an equation of the form $$y = k + ax_1 + bx_2 \ldots \quad \text{(Equation 1)}$$

where $y$ = drill machinability
$x_1, x_2 \ldots$ = independent variables

The factors which were studied for their effect upon drill machinability included hardness, sulfur content, manganese content, manganese-sulfur ratio, molybdenum content, silicon content, chromium content, nickel content and "chromium equivalent" (as hereinafter described).

Figure 1:
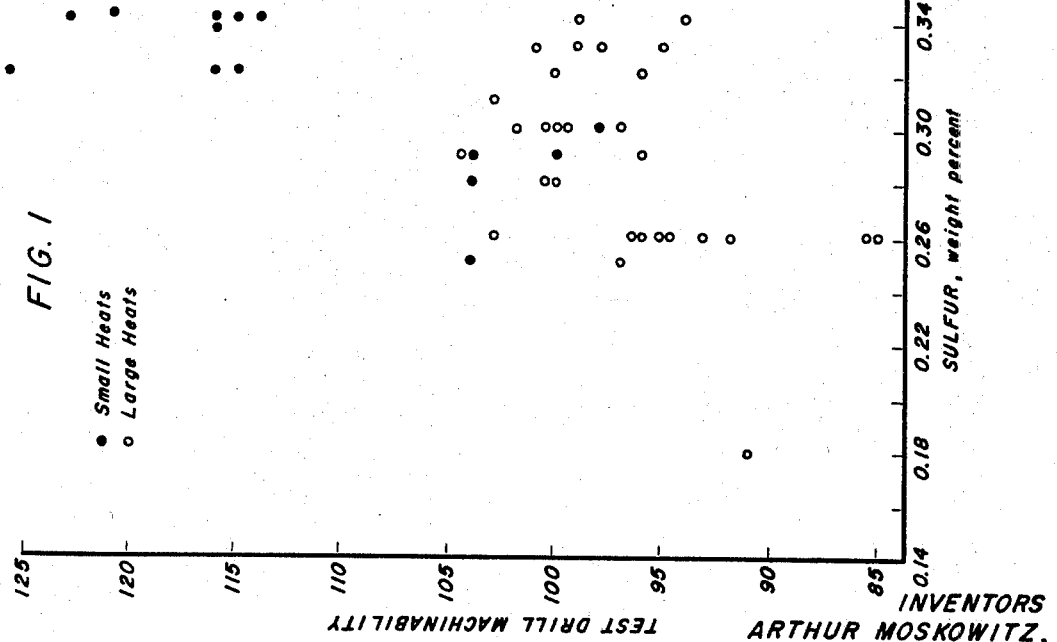
FIGURE 1 is a graphical representation of the relationship between sulfur content and the machinability of a first series of chromium stainless steels.

FIGURE 1, consisting of a graph relating weight percent sulfur content and observed values of test drill machinability, taken from Table I, is illustrative of the graphical approach taken in evaluating the effects of the above-mentioned factors. The wide scatter of the FIGURE 1 data, showing a lack of good correlation of machinability with sulfur content indicates that at least one and possibly several other factors also affect machinability. Therefore, the analysis was extended by assuming an effect for hardness, as well as for sulfur and reexamining the Table I data for possible improved correlation by adjusting the data to one hardness or to one sulfur level. Complete correlation was performed through a process of repeated analyses and adjustments. By such means, correlation was found between machinability and hardness, sulfur, manganese-sulfur ratio, molybdenum and "chromium equivalent."

Figure 2:
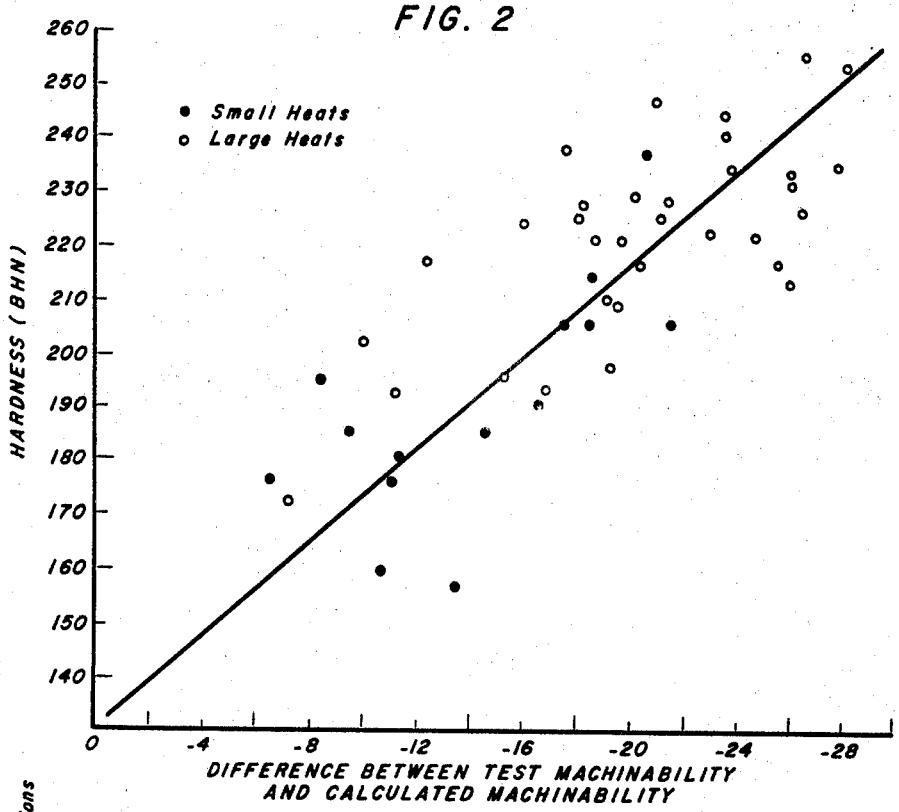
FIGURE 2 is a graphical illustration of the effect of hardness of chromium stainless steels upon the machinability thereof, expressed as the difference between observed test machinability and machinability calculated in accordance with a method herein disclosed.

Graphs were constructed by calculating the machinability expected when all factors were considered except the one being evaluated, thereby to show the effect of such latter factor. The difference between such calculated machinability values and the actually observed test machinability values was then plotted as a function of the factor being examined. Illustratively, FIGURE 2 shows the effect, thus determined, of hardness on drill machinability. Considerable data scatter was observed which is believed due largely to variations of the heat size and ingot size, processing factors, as well as to some inevitable variations in the drill test itself. However, as shown in FIGURE 2, a linear relationship between hardness and machinability is clearly indicated.

FIGURE 3 similarly relates machinability and sulfur content, after adjustment of other factors affecting machinability, and that figure also indicates a linear relationship.

It is known that manganese is the principal sulfide former in chromium-containing stainless steels such as Type 416 steel, although iron, chromium and molybdenum are also strong sulfide formers. Although present industry specifications for Type 416 steel provide for a manganese content of from 0 to 1.25%, this steel is invariably produced with a manganese content under about 1%, and most commonly under about .50 to .60%. At such low manganese levels, it was concluded that amounts of molybdenum and chromium might be present in the sulfides, so an attempt was made to correlate with machinability the ratio of manganese to molybdenum and that of manganese to chromium+molybdenum. However no correlation was found. Correlation was found, however, upon evaluation of the manganese-sulfur ratio, and slight improvement in correlation was noted by including the effect of chromium and molybdenum, expressed as the ratio $$\frac{\frac{Mn}{(Cr + Mo)}}{S}$$

as illustrated in FIGURE 4. The relationship illustrated in FIGURE 4 is a semi-logarithmic one which can be expressed as $$M = a + b \ln \left[ \frac{\frac{Mn}{(Cr+Mo)}}{S} - 0.99 \right]$$

(Equation 2)

where $M$ = difference between test and calculated drill machinability, and $a$ and $b$ are constants It is seen, therefore, that a substantial benefit is obtained by maintaining a high ratio of manganese $$\left( \text{or } \frac{Mn}{Cr+Mo} \right)$$

to sulfur.

The sum of chromium and molybdenum contents is relatively constant in the usual Type 416 composition (and, as described and shown hereinbelow, there is no advantage to adding larger amounts of molybdenum) and so these elements are of relatively lesser importance than is the manganese-sulfur ratio. Thus, the maximum improvement within the limits of the FIGURE 4 data is obtained as the $$\frac{\frac{Mn}{(Cr + Mo)}}{S}$$

ratio is increased over 0.20, where the manganese-sulfur ratio is about 2.5.

FIGURE 5, illustrative of molybedenum correlation with the difference between test and calculated drill machinability, shows a definite improvement in machinability at lower molybdenum values even though the data exhibits considerable scatter. This finding is quite surprising and defies present metallurgical explanation. Even assuming a linear relationship between molybdenum content and drill machinability (as indicated by Graph A or FIGURE 5), it is clear that, for highest machinability, molybdenum should not be included in the contemplated steels at levels at the upper part of the range heretofore utilized in Type 416 stainless steels, i.e., up to 0.60%. Indeed, the scatter band delineated by Graphs B and C of FIGURE 5 indicates a sharp change in the effect of molybdenum on machinability at a level between about 0.15 and 0.25%—as more clearly illustrated by the dashed line Graph D of FIGURE 5.

The structural characteristics of the contemplated steels have an important bearing on the machinability thereof. Standard Type 416 stainless steel is a hardenable steel which, in the mill-annealed condition, has an essentially tempered martensitic structure. Relatively recently, such steels have been compositionally modified to provide mill-annealed structures containing a substantial proportion of free ferrite, e.g., about 15 to 20%. Higher percentages, e.g., up to 50% and more, of ferrite are provided in the higher sulfur, extra free-machining varieties of 416 stainless steel, as the so-called "416F"—as hereinafter more fully identified. The term "duplex" is sometimes used to describe the latter steels, and occasionally is used in reference to the lower ferrite-containing steels. For the purposes of this invention, we use the "duplex" term to refer to any steel having a two-phase structure containing, in addition to a martensitic or tempered martensitic phase, a substantial portion of free ferrite. Ferrite, being relatively softer than a martensitic or tempered martensitic structure, enhances machinability. Ferrite-containing steels can be produced by chemistry changes as well as by changes in process factors during production of the steels. The elements affecting ferrite content, and commonly or occasionally present in stainless steels, are chromium, molybdenum, silicon, aluminum, nickel, copper, carbon and nitrogen. Therefore, the percentage of free ferrite in the steel structure is a function of the amounts and of the relative ferrite-promoting or -depressing tendencies of the latter elements which are present, whereby in turn, machinability of the steels is affected.

An effective "chromium equivalent" has been developed to determine the maximum amount of austenite obtainable at austenitizing temperatures for the contemplated hardenable stainless steels. Thus, the "chromium equivalent" for these steels is expressed as follows:

Chromium Equivalent=percent Cr+percent Si+1.5 (percent Mo)+10 (percent Al) −percent Ni−percent Cu−30(percent C+percent N)

(Equation 3)

A high chromium equivalent indicates a high ferrite content and, at a low chromium equivalent at about 8 or 9, the steel is completely austenitic at austenitizing temperatures. The effect of chromium equivalent on drill machinability of the Table I steels is illustrated in FIGURE 6 which shows that a machinability benefit is obtained with the presence of high-temperature ferrite. Thus, the smaller laboratory heats, having a chromium equivalent of about 13, indicative of about 50 volume percent ferrite content, are shown in FIGURE 6 to have very high machinability. The larger, commercial-sized heats, having a chromium equivalent of from 8 to about 10.5, show a benefit in increasing ferrite from 0 to about 20%.

In order to more fully evaluate, primarily, the effect of manganese and sulfur, singly and together, upon the machinability of the contemplated steels, a further series of 70 experimental steel compositions were prepared, containing varying quantities and ratios of these two elements. These steel compositions, together with the chromium equivalents, the ferrite content, the measured Brinell Hardness Numbers, observed drill machinability and machinability corrected to 0% ferrite and standard hardness (200 BHN) are given in Table II.

TABLE II

| Heat No. | C | Mn | S | Si | Ni | Cr | Mo | Cu | Ti | Zr | Al | Mn/S | Cr Eq. | Ferrite Content, Volume percent | Hardness, BHN | Test Machinability | Test Machinability Corrected to 200 BHN and 0% Ferrite |
|---|---|---|---|---|---|---|---|---|---|---|---|---|---|---|---|---|---|
| 165 | .23 | .49 | .10 | .12 | .25 | 14.16 | .12 | .05 | | | | 4.90 | 6.6 | 0 | 206 | 63 | 64 |
| 166 | .23 | .45 | .09 | .39 | .24 | 14.18 | .12 | .05 | | | | 5.00 | 6.9 | 0 | 201 | 67 | 67 |
| 165A | .113 | .45 | .14 | .10 | .28 | 12.66 | .13 | .05 | | | | 3.21 | 8.6 | 0 | 185 | 74 | 71 |
| 166A | .107 | .43 | .15 | .36 | .28 | 12.74 | .10 | .06 | | | | 2.87 | 9.1 | 0 | 196 | 78 | 77 |
| 169 | .22 | .45 | .10 | .43 | .33 | 14.18 | .12 | .05 | | | .04 | 4.50 | 7.6 | 0 | 203 | 66 | 67 |
| 170 | .22 | .45 | .10 | .40 | .36 | 14.14 | .11 | .06 | | | .11 | 4.50 | 8.2 | 0 | 195 | 66 | 65 |
| 171 | .23 | .45 | .10 | .45 | .33 | 14.12 | .12 | .07 | | | .22 | 4.50 | 9.1 | 0 | 192 | 70 | 68 |
| 172 | .23 | .46 | .10 | .42 | .35 | 14.04 | .12 | .07 | | | .54 | 4.60 | 13.1 | 0 | 190 | 76 | 74 |
| 169A | .110 | .40 | .15 | .35 | .24 | 12.88 | .12 | .06 | | | .05 | 2.67 | 9.7 | 1 | 190 | 83 | 81 |
| 170A | .101 | .39 | .15 | .34 | .24 | 13.00 | .13 | .06 | | | .11 | 2.60 | 10.7 | 15 | 187 | 85 | 79 |
| 171A | .100 | .42 | .25 | .39 | .39 | 12.68 | .13 | .11 | | | .14 | 1.68 | 10.6 | 9 | 194 | 99 | 96 |
| 172A | .103 | .41 | .24 | .39 | .39 | 12.68 | .13 | .11 | | | .55 | 1.71 | 14.6 | 36 | 188 | 102 | 91 |
| 173 | .109 | .45 | .21 | .42 | .38 | 12.88 | .12 | .10 | | | | 2.14 | 9.1 | 0 | 194 | 94 | 93 |
| 174 | .100 | .42 | .21 | .39 | .38 | 12.68 | .12 | .10 | .05 | | | 2.14 | 9.4 | 1 | 195 | 94 | 93 |
| 175 | .118 | .44 | .26 | .39 | .39 | 12.62 | .12 | .12 | .10 | | | 1.69 | 9.1 | 1 | 201 | 98 | 98 |
| 177 | .108 | .45 | .17 | .41 | .36 | 12.14 | .13 | .10 | | | | 2.65 | 8.4 | 0 | 191 | 89 | 87 |
| 178 | .105 | .44 | .17 | .39 | .35 | 12.08 | .12 | .10 | | .034 | | 2.58 | 9.0 | 0 | 192 | 89 | 87 |
| 179 | .107 | .39 | .19 | .37 | .38 | 11.76 | .12 | .10 | | .08 | | 2.06 | 8.3 | 0 | 192 | 90 | 88 |
| 181 | .107 | .52 | .26 | .42 | .40 | 12.44 | .12 | .12 | | | | 2.00 | 8.7 | 0 | 195 | 97 | 96 |
| 182 | .104 | .51 | .32 | .39 | .40 | 12.38 | .16 | .13 | | | | 1.59 | 8.8 | 0 | 195 | 99 | 98 |
| 183 | .107 | .52 | .52 | .41 | .41 | 12.48 | .24 | .10 | | | | 1.00 | 9.0 | 0 | 201 | 103 | 103 |
| 184 | .105 | .51 | .62 | .41 | .39 | 12.46 | .40 | .10 | | | | 0.84 | 9.2 | 0 | 198 | 99 | 99 |
| 183A | .107 | .55 | .34 | .42 | .38 | 12.82 | .13 | .12 | | | | 1.62 | 9.1 | 0 | 197 | 102 | 101 |
| 184A | .096 | .51 | .39 | .39 | .38 | 12.74 | .54 | .11 | | | | 1.31 | 10.2 | 1 | 204 | 102 | 103 |
| 185 | .111 | .72 | .32 | .42 | .36 | 12.64 | .21 | .10 | | | | 2.25 | 9.1 | 0 | 194 | 107 | 106 |
| 186 | .100 | .72 | .38 | .39 | .36 | 12.62 | .37 | .10 | | | | 1.90 | 9.5 | 1 | 197 | 108 | 107 |
| 185A | .102 | .34 | .31 | .39 | .38 | 12.54 | .13 | .12 | | | | 1.09 | 8.9 | 0 | 190 | 97 | 95 |
| 186A | .097 | .33 | .36 | .36 | .38 | 12.44 | .51 | .12 | | | | 0.92 | 9.5 | 0 | 202 | 98 | 98 |
| 187 | .107 | .56 | .28 | .40 | .38 | 12.50 | .21 | .11 | | | | 2.00 | 9.0 | 0 | 197 | 100 | 99 |
| 188 | .103 | .55 | .33 | .40 | .38 | 12.48 | .51 | .12 | | | | 1.67 | 9.4 | 1 | 200 | 103 | 103 |
| 189 | .104 | .56 | .20 | .42 | .36 | 12.66 | .13 | .10 | | | | 2.80 | 9.0 | 0 | 191 | 93 | 91 |
| 1188 | .099 | .36 | .33 | .41 | .47 | 12.74 | .17 | .12 | | | | 1.09 | 9.2 | 0 | 195 | 102 | 101 |
| 1189 | .090 | .55 | .34 | .39 | .48 | 12.68 | .17 | .12 | | | | 1.62 | 9.4 | 0 | 195 | 105 | 104 |
| 1190 | .097 | .81 | .33 | .39 | .47 | 12.70 | .17 | .12 | | | | 2.46 | 9.2 | 0 | 192 | 108 | 106 |
| 1191 | .095 | 1.02 | .34 | .39 | .47 | 12.68 | .17 | .12 | | | | 3.00 | 9.2 | 0 | 186 | 111 | 108 |
| 181A | .123 | .44 | .24 | .35 | .44 | 11.90 | .18 | .12 | | | | 1.83 | 7.7 | 0 | 196 | 95 | 94 |
| 182A | .108 | .42 | .31 | .31 | .44 | 12.40 | .56 | .12 | | | | 1.35 | 9.2 | 1 | 204 | 96 | 97 |
| 1233 | .101 | .67 | .35 | .41 | .38 | 12.82 | .12 | .12 | | | | 1.91 | 9.3 | 0 | 211 | 109 | 111 |
| 1234 | .113 | 1.27 | .35 | .40 | .41 | 12.78 | .18 | .12 | | | | 3.63 | 9.0 | 0 | 221 | 115 | 119 |
| 1235 | .113 | 1.85 | .35 | .35 | .41 | 12.72 | .17 | .12 | | | | 5.28 | 8.8 | 0 | 217 | 129 | 132 |
| 1236 | .100 | 2.59 | .34 | .36 | .40 | 12.68 | .17 | .12 | | | | 7.62 | 9.2 | 0 | 228 | 126 | 132 |
| 1304 | .100 | .60 | .31 | .38 | .48 | 12.66 | .20 | .15 | | | | 1.94 | 9.1 | 3 | 201 | 108 | 107 |
| 1305 | .093 | .60 | .32 | .37 | .47 | 12.70 | .20 | .15 | | | | 1.87 | 9.4 | 3 | 202 | 109 | 108 |
| 1306 | .105 | 1.09 | .32 | .40 | .45 | 12.84 | .20 | .15 | | | | 3.41 | 9.2 | 5 | 201 | 112 | 111 |
| 1307 | .103 | 1.08 | .33 | .39 | .44 | 12.86 | .21 | .15 | | | | 3.27 | 9.3 | 5 | 196 | 113 | 111 |
| 1308 | .094 | 1.66 | .31 | .40 | .45 | 12.74 | .21 | .15 | | | | 5.36 | 9.5 | 5 | 205 | 118 | 118 |
| 1309 | .090 | 1.66 | .31 | .39 | .45 | 12.72 | .21 | .15 | | | | 5.20 | 9.5 | 5 | 202 | 119 | 118 |
| 1310 | .102 | 1.11 | .22 | .38 | .45 | 12.70 | .20 | .15 | | | | 5.05 | 9.2 | 3 | 201 | 104 | 103 |
| 1311 | .100 | 1.11 | .21 | .39 | .45 | 12.74 | .20 | .15 | | | | 5.28 | 9.2 | 3 | 199 | 105 | 104 |
| 1312 | .096 | .62 | .14 | .35 | .42 | 13.58 | .19 | .09 | | | | 4.44 | 10.2 | 20 | 210 | 89 | 86 |
| 1313 | .107 | .63 | .14 | .35 | .41 | 13.58 | .19 | .09 | | | | 4.50 | 9.9 | 20 | 210 | 88 | 85 |
| 1314 | .105 | .61 | .14 | .35 | .41 | 13.58 | .19 | .09 | | | | 4.35 | 10.0 | 20 | 217 | 88 | 86 |
| 1315 | .103 | 1.07 | .28 | .40 | .46 | 13.22 | .19 | .12 | | | | 3.83 | 9.7 | 3 | 215 | 114 | 116 |
| 1316 | .094 | 1.06 | .27 | .40 | .48 | 13.22 | .19 | .12 | | | | 3.93 | 9.9 | 5 | 213 | 115 | 117 |
| 1317 | .102 | 1.06 | .27 | .40 | .46 | 13.28 | .19 | .12 | | | | 3.93 | 9.8 | 10 | 213 | 115 | 115 |
| 1318 | .098 | 1.61 | .27 | .40 | .46 | 13.14 | .19 | .13 | | | | 5.96 | 9.7 | 1 | 213 | 114 | 116 |
| 1319 | .099 | 1.64 | .27 | .40 | .46 | 13.12 | .19 | .13 | | | | 6.08 | 9.7 | 3 | 215 | 114 | 116 |
| 1320 | .097 | 1.61 | .27 | .40 | .46 | 13.18 | .19 | .13 | | | | 5.96 | 9.8 | 5 | 213 | 116 | 117 |
| 1405 | .111 | 1.87 | .11 | .36 | .31 | 13.14 | .16 | .05 | | | | 17.00 | 9.6 | 3 | 226 | 85 | 89 |
| 1405A | .114 | 1.94 | .23 | .32 | .40 | 12.98 | .17 | .09 | | | | 8.43 | 9.0 | 0 | 240 | 106 | 114 |
| 1406 | .095 | 2.73 | .22 | .39 | .44 | 12.72 | .17 | .12 | | | | 12.41 | 9.4 | 0 | 233 | 111 | 118 |
| 1406A | .116 | 2.85 | .32 | .34 | .49 | 12.52 | .17 | .12 | | | | 8.90 | 8.4 | 0 | 238 | 119 | 127 |
| 1407 | .100 | 3.68 | .22 | .39 | .45 | 12.66 | .16 | .11 | | | | 16.71 | 9.2 | 0 | 262 | 108 | 120 |
| 1407A | .118 | 3.54 | .28 | .33 | .52 | 12.50 | .17 | .12 | | | | 12.65 | 8.3 | 0 | 263 | 112 | 125 |
| 1408 | .091 | 4.62 | .22 | .39 | .46 | 12.64 | .17 | .12 | | | | 20.95 | 9.4 | 0 | 286 | 106 | 125 |
| 1408A | .114 | 4.44 | .24 | .35 | .52 | 12.50 | .17 | .17 | | | | 18.45 | 8.4 | 0 | 273 | 105 | 120 |
| 1451 | .101 | 2.11 | .52 | .56 | .32 | 13.02 | .19 | | | | | 4.06 | 9.8 | 15 | 205 | 143 | 140 |
| 1451P | .102 | 2.00 | .49 | .55 | .34 | 13.36 | .20 | | | | | 4.08 | 10.1 | 30 | 220 | 141 | 137 |
| 1451P | .102 | 2.00 | .49 | .55 | .34 | 13.36 | .20 | | | | | 4.08 | 10.1 | 30 | 198 | 146 | 138 |
| 1452 | .095 | 2.75 | .50 | .56 | .34 | 13.20 | .18 | | | | | 5.49 | 10.2 | 10 | 223 | 138 | 110 |
| 1452 | .095 | 2.75 | .50 | .56 | .34 | 13.20 | .18 | | | | | 5.49 | 10.2 | 10 | 264 | 127 | 137 |
| 1453 | .097 | 2.77 | .52 | .53 | .33 | 14.22 | .19 | | | | | 5.34 | 11.1 | 35 | 203 | 146 | 138 |
| 1658 | .079 | 1.22 | .34 | .50 | .40 | 17.96 | .22 | .17 | | | | 3.6 | 15.85 | 75 | 179 | 118 | |
| 1659 | .080 | 2.58 | .39 | .49 | .40 | 17.98 | .21 | .18 | | | | 6.6 | 15.81 | 75 | 179 | 128 | |

The steels of Table II were prepared in the form of 50-pound laboratory air melted heats, each of which was split into four 12-pound ingots per heat. Sulfur additions were made by adding iron sulfide for all heats except Nos. 183 and 184 wherein sulfur was added as elemental stick sulfur. A one-inch thick slice was cut from the top of each ingot for subsequent examination of the as-cast structure, and the remainder of each ingot was then forged to ¾-inch square bars, at a temperature in the range of 1800 to 2100°F. The forged bars were then heat treated to a 200 BHN hardness aim. For purposes of determination of drill machinability rating, as heretofore described, the bars were austenitized for one hour at 1800°F., and oil quenched, followed by a four-hour temper in the range of 1200 to 1400°F., to achieve the desired hardness.

The effect of chromium equivalent, as defined by Equation 3 above, upon ferrite content, expressed as volume percent, of the Table II steels, is graphically illustrated in FIGURE 7, wherein it is seen that the steels are essentially austenitic in structure up to a chromium equivalent value of about 9, whereupon further increases in chromium equivalent value are productive of the appearance of, and a progressive increase in, ferrite content to very substantial proportions, e.g., 20% and greater, at chromium equivalent values of 10 and above.

FIGURE 8 graphically illustrates the effect of ferrite content upon the drill machinability of the Table II steels. Although the data plotted in FIGURE 8 are scattered, FIGURE 8 is clearly indicative of the improvement in drill machinability upon increase in ferrite content, in an amount of about 0.25 machinability rating points per 1% increase in ferrite content (slope of the scatter band). The latter factor was utilized in correcting the observed test machinability values to 0% ferrite, as given in the last column of Table II. These latter values also reflect correction of the observed machinability figures to standard hardness (200 BHN) in accordance with the relationship illustrated in FIGURE 2.

The effect of the aforesaid variables upon machinability is perhaps best illustrated by graphically plotting, as described in connection with certain of the above-mentioned figures, the variable itself against the effect of that variable on machinability. This is accomplished by the same regression analysis procedure as described and established by the Table I steels, whereby any variable is first plotted against the test machinability rating and a correlation curve is thereby established. This first correlation curve then provides an initial estimation of the expected drill machinability rating for any steel from the value of the variable for that steel. The effect of a second variable is included by plotting the difference between the test machinability rating and the estimated machinability (based on the correlation for the first variable) against the second variable. If only two variables are involved, repeated application of this operation will establish the best correlation curves for both. Such a procedure can be repeated as often as necessary to obtain the best possible correlation curves for all possible variables. To clearly show the effect of any one variable on drill machinability, that variable is plotted against the difference between test drill machinability and machinability calculated for the summation of all other variables.

In this manner, then, the important effect of sulfur content upon machinability of the Table II steels is graphically depicted in FIGURE 9, wherein it is seen that sulfur additions result in rapid improvement of drill machinability up to a sulfur value of about 0.45 or 0.50%, but that little or no further improvement results upon the incorporation of larger quantities of sulfur.

FIGURE 10 shows that the drill machinability rating of the Table II steels is increased to a maximum by the use of manganese at a level of about 2.5 to 3.0% for steels having a sulfur content of about 0.30 to 0.35%.

FIGURE 11 illustrates the important effect of the manganese-sulfur ratio upon drill machinability (expressed as the difference between test and calculated drill machinability rating), from which figure it is noted that machinability is rapidly improved by increasing the manganese-sulfur ratio up to a value of about 6 or 8 to about 10, whereupon only slight improvement is obtained with the use of greater sulfur-manganese ratios.

The effects, individually established as aforesaid, of the several aforementioned independent variables upon drill machinability may be mathematically expressed as a summation of the calculated effects of the individual variables. For example, for Type 416 stainless steels as those of Table II, machinability may be determined as follows:

$$CDM = 187.0 + 46.5 \ln S + 16.7 \ln Mn/S$$
$$+ 0.25 \text{ ferrite} - 0.20 \text{ BHN} \quad \text{(Equation 4)}$$

where

CDM = calculated drill machinability
ln = logarithm to base $e$
S = weight percent sulfur
Mn/S = manganese-sulfur ratio
ferrite = volume percent high temperature ferrite
BHN = Brinell hardness number The particular relationship defined by Equation 4 is applicable to steels wherein sulfur is present from about 0.10 to 0.50%, the manganese-sulfur ratio is between about 0.5 to 1 and 20 to 1, the hardness is about 175 to 275 BHN and wherein the steels contain up to about 50% ferrite. Similar relationships are derivable, of course, for other steel compositions contemplated by the invention.

FIGURE 12 graphically illustrates the good correlation achieved between test machinability values and machinability values calculated by use of Equation 4 for the Table II steels—which finding, of course, supports the validity of the conclusion drawn as to the effects of the several parameters evaluated upon drill machinability.

The Table II data, and the graphs of FIGURES 9, 10 and 11 erected thereupon, clearly demonstrate the importance and distinct effects of the variables, sulfur content, manganese content, and manganese-sulfur ratio, upon machinability of the contemplated steels. Accordingly, in order to evaluate the inter-effects of these variables upon machinability, the graphs of FIGURE 13 were constructed upon the data of Table II, relating varying manganese contents, sulfur contents (and thereby manganese-sulfur ratio) and drill machinability. The curves of FIGURE 13 denoted "80," "90," "100," etc., represents constant drill machinability ratings for the Table II steels [comprising a base of constant chromium equivalent (0% ferrite) and hardness (200 BHN)], and are derivable either by plotting the actual test machinability values, or by use of Equation 4.

As shown above in regard to FIGURE 11, and as more clearly illustrated by FIGURE 13, the rate of improvement of drill machinability with increasing manganese-sulfur ratio decreases rapidly above a ratio of about 10 to 1, although a slight improvement continues to much higher ratios, e.g., up to 20 and even higher. However, in accordance with FIGURES 9 and 10, sulfur contents over about 0.45–0.50%, and, for 0.30–0.35% sulfur steels, manganese contents over about 3%, are not productive of further significant contents over about 3%, are not productive of further significant enhancement of machinability. Similarly, for higher sulfur steels, e.g., those containing up to about 0.50% sulfur, amounts of manganese over about 4 to 5% do not appreciably enhance machinability, as indicated by FIGURE 11. In view of certain detrimental effects of greatly increased quantities of these elements, e.g., decrease in surface quality and corrosion resistance due to sulfur, and the effect of manganese in reducing the $A_1$ temperature, thus decreasing maximum temperature for mill annealing and increasing minimum attainable mill-annealed tempered hardness for machining purposes, a maximum manganese-sulfur ratio of 10 to 1 is set as a preferred upper limit for the steels of the invention. Likewise, a maximum limit for sulfur is set at 0.45–0.50% and for manganese at 3 to 4 or 5%, preferably about 2.5%.

The area designated "FG" in FIGURE 13 is representative of one current variety of the general Type 416 composition, i.e., the so-called "forging grade" 416 which contains the usual amount of manganese, i.e., about 0.30 to about 0.60%, together with a relatively low sulfur content, i.e., about 0.15 or 0.18 to 0.25%. Sulfur, although well known for its property of enhancing machinability of stainless steels, also results in reduced forgeability and corrosion resistance, as well as inferior surface finish quality. Thus, the usual forging grade Type 416 steel, by reason of the low sulfur content, is the most forgeable of the current varieties of steels generally characterized as Type 416. This steel composition, however, is not readily machinable, having, as shown in FIGURE 13, a maximum drill machinability rating of about 95.

The hatched area of FIGURE 13 denoted by "416" represents the "regular" Type 416 composition of common usage which has an intermediate sulfur content between about 0.25 and about 0.35% or 0.40%. Commensurately, machinability of this composition is greater than that of the forging grade (FG) material, i.e., it has a drill machinability rating, as shown in FIGURE 13, between about 85 and 105.

The prior art also provides a "free-machining" Type 416 composition, denoted by the area "F" of FIGURE 13, wherein the enhanced machinability (i.e., a drill machinability rating between about 95 and 110 as shown in FIGURE 13) is attributable to the high sulfur content, from over about 0.35, e.g., 0.40%, to about 0.50%.

As aforesaid, the "416F" steels of the prior art have duplex microstructures, i.e., they contain up to about 50% or more free ferrite. However, these ferrite-containing duplex steels are substantially non-hardenable, in contrast to attainable hardnesses of about $R_c40$ (370 BHN) for steels otherwise similar but containing no free ferrite. This fact limits the ferrite-containing steels in some end use applications, for example, those applications wherein machined parts must be hardened by heat treatment. The duplex free-machining Type 416 steels, such as those having compositions falling within the area "F" of FIGURE 13, are the most machinable of all the prior art Type 416 steels now in use.

The present invention provides, by the utilization of certain restricted quantities of sulfur and manganese, and by balancing these elements with each other in a limited manner, and by proper balance of other alloying elements, new and improved chromium-containing stainless steels having remarkably enhanced machinability, together with retention of other desirable and necessary properties. Thus, application of those principles of the invention regarding a restricted balance of sulfur and manganese, is productive of improved steels having all of the advantages of prior art steels analogous to Types "416 FG," "416" (regular and duplex), and "416F" (duplex and non-duplex), but possessing, additionally, greatly enhanced machinability.

Reference to FIGURE 13 will disclose areas thereof denoted, respectively, "FG–E," "416–E" and "F–E." Those areas represent steel composition, in accordance with Table II, wherein sulfur and manganese are chosen within the limited ranges and proportions of each delineated by the illustrated boundaries of those respective areas. Thus, area "FG–E" defines a family of enhanced forging grade steels containing from about 0.18 to about 0.25% sulfur and from about 0.80 to about 1.25% manganese. In contrast to the prior art forging grade steels, which have a drill machinability rating, as determining by means of the aforesaid tests, from about 75 to about 95 (as shown in FIGURE 13), the improved forging grade steels of the invention exhibit a drill machinability rating of from about 95 to about 113—thereby constituting products heretofore unknown in the art, i.e., straight chromium steels, which although readily forgeable because of the relatively low sulfur content, also are as machinable as the prior art regular 416 type steels having much higher sulfur contents. Sulfur, of course, although beneficial to machinability, is also productive of decreased surface finish quality and corrosion resistance. Therefore, enhancement of machinability without adverse effect on surface quality constitutes a definite step forward in the art.

Similarly, area "416–E" of FIGURE 13 defines a group of improved steels of the general Table II base composition, wherein sulfur is present in the usual regular Type 416 amount, i.e., about 0.25 to about 0.35% or 0.40%, but wherein a higher manganese-sulfur ratio is utilized by limiting manganese to a value of from about 0.80 to about 1.25%. As will be seen from the constant machinability curves of FIGURE 13, the improved "416–E" steels of the invention exhibit a drill machinability rating of from about 105 to over 120—in contrast to the prior art steels with comparable sulfur contents, which have a drill machinability rating of only about 85 to 105.

Still further, area "F–E" of FIGURE 13 is representative of steels having sulfur contents comparable to those of the prior art 416–F steels, but having a drill machinability rating of from about 112 to about 125, whereas the comparable prior art steels have a rating range of only 95 to 110.

The invention also provides still further improvements in the form of the new steels represented by the area "RFG" of FIGURE 13. These steels, which we designate "revised forging grade," have low sulfur contents (0.18 to 0.25%) comparable to those of the prior art forging grade material, but in these new steels the manganese content, hence the manganese-sulfur ratio, is raised to levels heretofore considered unusable. Thus, the "RFG" steels contain upwards of 1.25% manganese to about 2.5% manganese, sulfur and manganese being balanced, as shown in FIGURE 13, in a manner such that the manganese-sulfur ratio is between about 5 to 1 and, preferably, 10 to 1. These new steels show machinability ratings from over 100 to over 120—equal or superior to the machinability of the best prior art free-machining steels. Yet, the new steels are readily forgeable and have no less surface quality and equivalent corrosion resistance (due to the same relatively low sulfur content) as the prior art forging grades.

Still further new steels are provided by this invention, e.g., as indicated by the area "SFM" of FIGURE 13. These steels, which we characterize as "super free-machining" steels, contain the usual sulfur content of the prior art regular 416 type steels, yet by reason of incorporation of a critical manganese content, and balance thereof with sulfur and with the other alloying elements in the steels, these new steels show drill machinability ratings far above any heretofore known in steels of the kind contemplated. Thus, the "SFM" steels of the invention possess, as depicted in FIGURE 13, machinability ratings of about 115 to over about 140—as compared with a maximum rating of about 110 for the best prior art free-machining steels. The SFM steels are balanced in regard to sulfur and manganese contents so that the manganese-sulfur ratio is between about 3 to 1 and 10 to 1, preferably 5 to 1 to 9 to 1. Maximum manganese content is limited to about 4.0%, preferably about 3.5%, and more especially about 2.5 or 3.0%.

In its utmost extent, the invention provides a further new class of steels which we characterize as "ultra free-machining" steels, designated compositionally and performancewise by the area "UFM" of FIGURE 13. These new steels, having highest sulfur contents, analogous to those of the prior art free-machining grades, contain manganese in amounts of from over 1.25%, preferably from 1.50%, to about 5.0%, preferably to about 3.5%, and the manganese-sulfur ratio thereof ranges from about 3 to 1 to about 10 to 1, preferably to about 8 to 1. These ultra free-machining steels have altogether heretofore unheard of machinability ratings—from about 125 to far in excess of 140. Even the latter rating—30 points in excess of the best attainable rating in prior art steels of the character contemplated—represents nearly a 30% improvement over the best performance of prior art steels.

The relationship of the inventive steels, vis-a-vis drill machinability rating, to each other and to prior art steels, is perhaps more clearly delineated in the bar graph of FIGURE 14, wherein the length of each bar is representative of the drill machinability range, as determined by the tests set out herein, for the respective steel compositions, and the midpoint of each bar, constituting the dividing line between shaded and unshaded portions thereof, represents the average machinability rating. FIGURE 14 also shows the principal applications for the several classes of steels therein depicted, together with a generalized indication of their respective compositions and performances in those applications.

As noted in Table II and as heretofore described, the several graphs of FIGURE 13 are based upon a correction of the test machinability data for the experimental steels to 0% ferrite. Similarly, the prior art steels, denoted as "FG," "416" and "F" in FIGURE 13, for which machine ratings are plotted in the latter figure, were ferrite-free steels. As also heretofore pointed out, the presence of ferrite enhances machinability and the value of this fact has been realized by the prior art in the provision of duplex steels containing relatively large percentages of ferrite. The presence or absence of ferrite as well as the amount thereof, may be controlled by a proper balance of composition (for example, in accordance with Equation 3 above), and by proper selection of processing factors during manufacture. Provision of any particular, desired percentage of ferrite in the steel compositions, including the prior art steels, represented in FIGURE 13, would merely shift upwardly the respective machinability ratings illustrated in FIGURE 13. The relationships between the FIGURE 13 constant machinability lines for the individual steels would, of course, be unaltered. The invention therefore contemplates the provision of steels, in accordance with the inventive principles herein set forth, having either a ferrite-free or a duplex structure. Accordingly, the inventive steels designated by the several different areas of FIGURE 13 are considered representative of the steels of the invention, which also includes steels of a duplex structure, and the machinability ratings as determined from the experimental data herein tabulated and plotted in FIGURE 13 are considered minimum values only.

As heretofore noted, manganese, being a strong sulfide former, forms manganese sulfide in the inventive steels and, chromium also being a strong sulfide former and present in large quantities in these steels, results in the formation of chromium sulfides. It has been found that the relative amounts of the manganese sulfide and chromium sulfide phases, as well as the composition of the manganese sulfide phase in the steels of the type herein contemplated, are related to the manganese-sulfur ratio and the thermal history of the steels.

Thus, at low maganese-sulfur ratios, the sulfide inclusions which are formed in the steels may contain 50% or more chromium sulfide, as a separate phase, whereas, as the maganese-sulfur ratio increases, the proportion of chromium sulfide phase decreases and finally disappears, i.e., at a maganese-sulfur ratio of 3.0 or greater in the cast ingots of the Table II steels. It was determined that, in steels having low manganese-sulfur ratios, e.g., under 3.0, wherein large amounts of the chromium sulfide phase are present in the duplex sulfide inclusions, the chromium sulfide phase is in the form of platelets, whereas, when the manganese-sulfur ratio is increased, and the proportion of chromium sulfide is thereby decreased, the latter phase occurs in the form of a fine precipitate. In all cases, the major chromium sulfide phase was found to be $CrS_{1.17}$ as determined by X-ray diffraction studies of extracted inclusions.

The decrease of chromium sulfide content, and the change in form thereof from platelet to fine precipitate, with increasing manganese-sulfur ratio, is illustrated in FIGURES 15A–F. FIGURES 15A–C illustrate the appearance of sulfide inclusions in cast steels, i.e., heat Nos. 184, 1189 and 1191, comprising manganese-sulfur ratios of, respectively, 0.82, 1.62 and 3.0. FIGURES 15D–F illustrate the appearance of sulfide inclusions in the same heats after forging to bar form as hereinabove described. The samples illustrated in FIGURES 15A–F were unetched samples and the illustrated photographs were made at a magnification of 1500. In each of the photographs of FIGURES 15A–F, the light gray, plate-like phase is chromium sulfide; the darker gray phase is manganese sulfide, and the black phase is silicate. The light gray, chromium sulfide phase is opaque and appears yellow-tan in white reflected light, and demonstrates anisotropy in polarized light. The darker gray, manganese sulfide phase is opaque when a relatively large amount of chromium is in solution therein, but becomes transparent and the transmission color changes from dark brown, through yellow, to a pale green with decreasing amounts of dissolved chromium.

It will be seen from an inspection of FIGURES 15A–C, that, with increasing manganese-sulfur ratio, the chromium sulfide phase diminishes until it is substantially absent in the cast sample of FIGURE 15C, having a manganese-sulfur ratio of 3.0. It was also found that as the manganese-sulfur ratio is increased above 3.0, the transparency of the manganese sulfide increases and the color in transmitted light changes from dark brown, to brownish yellow, to light yellow at a manganese-sulfur ratio of 7.62, and thereafter to a greenish color at even higher manganese-sulfur ratios, indicative of a gradual reduction of dissolved chromium content eventually giving a pure manganese sulfide phase at high manganese-sulfur ratios.

Inspection of FIGURES 15D–F, illustrating sulfide inclusions observed in the forged bars of the indicated heats, shows that less chromium sulfide phase is present in the forged material than in the as-cast ingots for a particular manganese-sulfur ratio. The appearance of a relatively large proportion of the light gray phase in FIGURE 15D shows that considerable quantities of chromium sulfide were present in that sample having a manganese-sulfur ratio of 0.82. On the other hand, as shown in FIGURE 15E, the chromium sulfide phase was not substantially apparent in the forged material having a manganese-sulfur ratio of 1.62. It was found that, for the forged material, the chromium sulfide disappears at a manganese-sulfur ratio between about 1.09 and 1.6 as contrasted to the as-cast material wherein it disappears at a manganese-sulfur ratio between about 2.46 and 3.0. Also, as illustrated in FIGURE 15F, the manganese sulfide phase of the forged steel has greater transparency than in the cast steel, thus indicating less dissolved chromium in the manganese sulfide phase of the forged steels than in cast steels of the same manganese-sulfur ratio.

In order to further evaluate the effect of heat treatment of the contemplated steels upon the composition of the sulfide inclusions, samples from certain of the Table II as-cast ingots with varying sulfur ratios were heated for four hours at different temperatures, i.e., 1550° F., 1950° F. and 2600° F., the heating being done in an argon atmosphere. Such tests were done, on the one hand, with a steel, i.e., heat No. 184, containing a low manganese-sulfur ratio of 0.82 (FIGURES 16A–C), and, on the other hand, with steel No. 1191, having a manganese-sulfur ratio of 3.0 (FIGURES 16D–F). FIGURES 16A–C show that there is little difference in the appearance of the sulfide phases in the steels with the lower manganese-sulfur ratio upon heating up to 1950° F. Upon heating to the higher temperature of 2600° F., as shown in FIGURE 16C, the light gray chromium sulfide phase is still present although the sulfide inclusions were observed to increase in size and a fine precipitate is apparent and is believed to be a second sulfide phase. On the other hand, FIGURES 16D–F, illustrative of the higher (3.0) manganese-sulfur ratio, show that the chromium sulfide phase disappeared in all samples, even at the lowest heating temperature, 1550° F. Indeed, it was found that such was the case in all samples having a manganese-sulfur ratio above about 1.5.

Chromium sulfide is considerably harder than pure manganese sulfide, and we find that manganese sulfide containing considerable dissolved chromium is harder than pure manganese sulfide. A change in hardness of the sulfide inclusions could be expected, by those knowledgeable in the art, to influence machining characteristics. The relationship between inclusion hardness and manganese-sulfur ratio is graphically illustrated in FIGURE 17 wherein the manganese-sulfur ratio is plotted against inclusion hardness as reflected by the diagonal length of impressions made on the inclusion via the hardness testing apparatus. The hardness of the sulfide inclusions was measured with a standard micro-hardness testing apparatus, but the small size of the inclusions necessitated the substitution of the usual 30- or 60-gram load by a 6-gram load. Largest inclusions were selected for hardness testing, and at least 10 determinations were made for each sample to minimize errors due to matrix effects.

The impression diagonal factor was plotted against the manganese-sulfur ratio, as shown in FIGURE 17, both for as-cast material and for material heated four hours at both 1550° F. and 1950° F. As also shown in FIG- URE 17, an increase of manganese-sulfur ratio, for both as-cast and heat treated material, is productive of larger impression diagonal length, i.e., less hardness, up to a manganese-sulfur ratio of about 4 or 5, above which little decrease in hardness is observed.

The effect of manganese-sulfur ratio of the Table II steels upon the composition of the sulfide phase present therein was determined by electron probe microanalysis of the sulfide phases in certain of the Table II steels, both in cast and wrought form. The results of such tests are set forth in Table III, the data of that table being graphically depicted in FIGURES 18 and 19.

TABLE III

| Heat Number | Mn/S Ratio | Sulfide Composition in Cast Steel | | | | Sulfide Composition in Wrought Steel | | | |
|---|---|---|---|---|---|---|---|---|---|
| | | Fe | Cr | Mn | S | Fe | Cr | Mn | S |
| 1188 | 1.09 | 2 | 45 | 15 | 41 | 12 | 32 | 12 | 33 |
| 1189 | 1.62 | 2 | 35 | 21 | 38 | 24 | 19 | 20 | 28 |
| 1233 | 1.91 | 3.3 | 34.1 | 29.7 | 42.3 | 28.8 | 13.2 | 31.2 | 17.6 |
| 1190 | 2.46 | 2 | 26 | 31 | 41 | 24 | 13 | 33 | 27 |
| 1191 | 3.00 | 6 | 21 | 33 | 40 | 11 | 4 | 44 | 40 |
| 1234 | 3.63 | 4.7 | 15.1 | 46.5 | 37.3 | 15.8 | 5.7 | 50.8 | 28.1 |
| 1235 | 5.29 | 2.2 | 7.2 | 53.7 | 37.7 | 2.6 | 1.5 | 58.8 | 40.8 |
| 1236 | 7.62 | 3.8 | 4.0 | 56.2 | 32.0 | 2.6 | 3.5 | 52.8 | 31.2 |

Thus, in FIGURE 18, the manganese-sulfur ratio is set forth as a function of the percent metal content of the sulfide inclusions (in terms of iron, chromium and manganese contents) for the Table III steels in the as-cast condition. From that figure, it will be seen that the chromium content of the inclusions rapidly decreases with an increase in manganese-sulfur ratio up to a value of about 8, whereas the manganese content of the inclusions rapidly increases with increase of the manganese-sulfur ratio up to about the same figure. Similarly, for the same steels in the forged condition, as illustrated in FIGURE 19, chromium content reaches a minimum at a manganese-sulfur ratio of about 5 or 6 and the manganese content reaches a maximum at about the same manganese-sulfur ratio. The sulfide compositions as set forth in FIGURES 18 and 19 further confirm the aforesaid microscopic studies vis-a-vis the decrease of chromium in the sulfide and the increase of manganese therein with increasing manganese-sulfur ratio. These tests showed that the chromium sulfide phase substantially disappears from the inclusions at a chromium level in the sulfide inclusions of from about 21 to 26 weight percent. As in the microscopic studies, it will also be noted that microanalysis tests showed that the chromium content of the sulfides in the forged material is less than that in the cast material, the difference being dependent upon the manganese-sulfur ratio of the steel. It is also noted that, as the chromium and manganese contents of the sulfide phase changes, the iron content of the sulfide phase also changes. Apparently, during heating, as in hot working, the chromium diffuses out of the sulfide into the matrix, manganese and iron diffuse from the matrix into the sulfide. However, comparison of FIGURES 18 and 19 shows that, at manganese-sulfur ratios above about 6 to 7, heating causes little or no diffusion of the alloying elements into or from the sulfide which is essentially pure manganese sulfide.

Consequently, as previously described, a manganese-sulfur ratio of 10 to 1, preferably 6 to 1 or 8 to 1, is set as an upper limit for the steel compositions of the invention beyond which limit no substantial advantage is conferred. A lower limit on the manganese-sulfur ratio of the steels of the invention is preferably set at about 3 to 1. However, selection of a particular manganese-sulfur range is dependent upon the type of steel desired within the limits of the invention for, as shown above, improved machineability can be achieved in certain of the higher sulfur steels, lower manganese steels of the invention at manganese-sulfur ratios even below 3 to 1.

As indicated hereinabove, a large proportion of chromium steels, such as Type 416, are provided by the mill producer in a mill-annealed condition, which gives optimum machinability, and such materials are often machined and used in this condition without further heat treatment. Mill annealing is most frequently conducted by tempering the steel just below the $A_1$ temperature, for example, 1200 to 1400° F. for Type 416 stainless steel. For such purposes, minimum hardness is desirable. The factors determinative of annealed hardness are the as-quenched hardness of the steel and the tempering temperature. Higher tempering temperatures are required for materials having higher as-quenched hardnesses. However, the maximum tempering temperature is limited by the $A_1$ temperature of the alloy inasmuch as hardening occurs if the latter temperature is exceeded, due to the formation of austenite which, upon cooling of the steel, forms the relatively much harder martensite. The $A_1$ temperature of the usual Type 416 steel, containing about 0.40 to 0.60% manganese, is between about 1450 and 1500° F. Manganese is an austenite stabilizer in stainless steels and lowers the $A_1$ temperature. However, the steels of the invention, containing relatively much larger quantities of manganese than heretofore utilized in chromium-containing stainless steels of the type herein contemplated, are readily mill-annealed at practical temperatures. Thus, the effect of manganese on delta ferrite formation, as well as on the $A_1$ temperature, was determined by conventional metallurgical techniques employing annealed specimens heated at various temperatures to form austenite, the amount of which was estimated visually from the martensite present after quenching. A temperature range from 1300 to 2400° F. was studied, and the results are set forth in Table IV.

TABLE IV

| Heat Number | Mn (percent) | Austenite (percent) [a] | | | | | | | | | | |
|---|---|---|---|---|---|---|---|---|---|---|---|---|
| | | 1,300° F.[b] | 1,350° F.[b] | 1,400° F.[b] | 1,450° F.[b] | 1,500° F.[c] | 1,550° F.[c] | 1,800° F.[c] | 2,000° F.[c] | 2,100° F.[c] | 2,200° F.[c] | 2,400° F.[c] |
| 1188 | 0.36 | | | 0 | 0 | 50 | 60 | 100 | 100 | 95 | 93 | 50 |
| 1189 | 0.55 | | | 0 | 0 | 50 | 65 | 100 | 100 | 98 | 92 | 50 |
| 1233 | 0.67 | 0 | 0 | 0 | 0 | 50 | 65 | 100 | 100 | 98 | 95 | 55 |
| 1190 | 0.81 | | | 0 | 0 | 55 | 70 | 100 | 100 | 95 | 92 | 60 |
| 1191 | 1.02 | | | 0 | 0 | 65 | 90 | 100 | 100 | 95 | 90 | 70 |
| 1234 | 1.27 | 0 | 0 | 5 | 10 | 75 | 90 | 100 | 100 | 95 | 95 | 65 |
| 1235 | 1.85 | 0 | 0 | 30 | 60 | 95 | 98 | 100 | 100 | 95 | 98 | 65 |
| 1236 | 2.59 | 0 | 0 | 95 | 95 | 100 | 100 | 100 | 100 | 95 | 98 | 65 |

[a] Based on visual estimates on oil-quenched specimens tempered 6 min. at 1,050° F. to darken the fresh martensite transformed from austenite present at the indicated heating temperatue.

[b] Rating for samples at 1,300–1,450° F. are for material initially annealed 30 hours at 1,300° F. to produce an aggregate of ferrite and fine carbide. Specimens were heated 4 hours in salt at 1,350–1,450° F. for austenite determination.

[c] Ratings for samples at 1,500° F. and higher are for material initially annealed 4 hours at 1,400° F. for austenite determination. Samples at 1,500–1,550° F. were heated 4 hours in salt, samples at 1,800–2,000° F. were heated ½ hour in salt, and the samples at 2,400° F. were heated 15 min. in argon.

From the data of Table IV, it will be seen that the $A_1$ temperature of alloys having a manganese content as high as 1.02% (steels No. 1191) is between 1450 and 1500° F. The $A_1$ temperature is reduced below 1450° F. at manganese levels over 1.27%, and appears to be close to 1400° F. at the 1.27% level. As seen from Table IV, 30% austenite was present at the 1.85% manganese level, and 95% austenite was present at the 2.59% manganese level, both at a temperature of 1400° F., indicating that the $A_1$ temperature for these alloys is below 1400° F.

The effect of manganese content upon attainable hardness and tempering response of the inventive steels was evaluated by determining the hardness of samples in, first, a quenched condition, and then in a condition brought about by quenching followed by tempering for four hours at temperatures between 500 and 1400° F. with results as given in Table V.

tempering temperature of about 500 to about 600° F. is frequently used, and for moderate strength, tempering is carried out at a higher temperature, for example, about 1100° F. Accordingly, the Table V tests included tempering tests at temperatures from 500 to 1200° F. (as well as, as above described, at 1300 and 1400° F.). These tests showed no significant effect of increased manganese on tempered hardness (for these applications requiring high hardness) for the 500 to 800° F. tempers, although a slightly lower tempered hardness was observed with the higher manganese steels, i.e., those having a manganese content from 0.81 to 2.59%, in the tempering range of 900 to 1100° F. At 1200° F. (and also 1300° F.) increased manganese had no discernible effect upon hardness.

The Table V data for the oil-quenched samples indicates that increasing the manganese content up to 1.85% had no effect on quenched hardness, although the

TABLE V

| Heat No. | Weight Percent Mn | Oil Quenched | BHN a at Indicated Tempering Temperature | | | | | | | | | |
|---|---|---|---|---|---|---|---|---|---|---|---|---|
| | | | 500° F. | 600° F. | 700° F. | 800° F. | 900° F. | 1,000° F. | 1,100° F. | 1,200° F. | 1,300° F. | 1,400° F. |
| 1188 | .36 | 389 | 411 | 390 | 397 | 403 | 417 | 295 | 258 | 227 | 203 | 190 |
| 1189 | .55 | 405 | 390 | 385 | 397 | 390 | 395 | 290 | 251 | 229 | 203 | 189 |
| 1233 | .67 | 387 | 390 | 403 | 417 | 432 | 403 | 290 | 258 | 226 | 205 | 192 |
| 1190 | .81 | 396 | 379 | 379 | 372 | 403 | 395 | 287 | 244 | 221 | 210 | 186 |
| 1191 | 1.02 | 382 | 379 | 390 | 385 | 395 | 390 | 287 | 234 | 221 | 200 | 186 |
| 1234 | 1.27 | 414 | 382 | 390 | 390 | 403 | 395 | 282 | 242 | 219 | 202 | 181 |
| 1235 | 1.85 | 389 | 385 | 397 | 382 | 390 | 385 | 282 | 241 | 215 | 205 | 232 |
| 1236 | 2.59 | 420 | 382 | 385 | 390 | 385 | 379 | 280 | 242 | 221 | 208 | 279 | a Hardness of as-quenched specimens converted from Rockwell C determinations; hardness of tempered specimens determined in DPH on a Gries Universal machine and converted to BHN.

For use in the mill-annealed condition, minimum hardness is required for best machinability. Therefore, certain of the Table V tests were conducted at mill annealing temperatures, i.e., 1300 and 1400° F., to determine the effect of such tempering temperatures upon hardness. As shown in the table, and in Table IV, the steels of the invention may be suitably tempered for such purposes at the 1300 and 1400° F. levels. Thus, when tempered at 1300° F., all of the steels evaluated in the Table V series, having manganese contents from 0.36 to 2.59%, had hardnesses between 200 and 210 BHN, which is within the desired mill-annealed hardness range, changing manganese content having no discernible effect. Moreover, the Table V steels having manganese up to 1.27% had hardnesses in the range of 181 to 192 BHN when tempered at 1400° F. The 1.85 and 2.59% manganese steels (Nos. 1235 and 1236) had hardnesses of, respectively, 232 and 279 BHN, because of austenite formation (as shown in Table V). Thus, the allowable tempering temperature to produce desired low hardness in the inventive steels is somewhat reduced (as compared to the tempering temperature for prior art, lower manganese steels) at the higher manganese levels within the contemplated range, but this temperature reduction is relatively slight at the 2% manganese level, and even at 2.6% manganese and higher, minimum hardnesses less than 210 can be achieved, e.g., by use of a 1300° F. temper. Moreover, reference to FIGURE 13 shows that the machinability benefits which can be obtained by increasing the manganese contents of the new steels to values as high as 2.5, 3.0% or even greater, outweigh the possible detriment of higher mill-annealed hardness.

For other applications, steels of the type herein contemplated are used in a hardened condition, wherein the steels must be heat treatable to higher hardness levels. For these purposes, usual hardening procedure involves austenitization at, for example, 1800° F., followed by an oil quench and temper, for example, for four hours at the required temperature. For high strength requirements, a quenched hardness of the 2.59% manganese steel (No. 1236) was apparently slightly increased. Further tests on the same Table V steels were conducted to investigate the possibility that the use of a high manganese content was productive of retained austenite. Thus, the hardness of oil-quenched specimens was compared to that of specimens subjected to an oil quench, followed by refrigeration for four hours, at −320° F. The results of such tests are given in Table VI.

TABLE VI

| Heat Number | Weight Percent Mn | Austenitize 1,800° F./ 1 Hr. Oil Quench (R_c) | Austenitize 1,800° F./ 1 Hr. Oil Quench, Refrigerate 4 Hr. at −320° F. (R_c) |
|---|---|---|---|
| 1188 | .36 | 41.5 | 41.0 |
| 1189 | .55 | 43.5 | 42.5 |
| 1233 | .67 | 41.0 | 41.0 |
| 1190 | .81 | 42.5 | 42.0 |
| 1191 | 1.02 | 41.0 | 39.0 |
| 1234 | 1.27 | 44.5 | 44.5 |
| 1235 | 1.85 | 42.5 | 43.5 |
| 1236 | 2.59 | 45.0 | 45.0 |

The data of Table VI show that manganese contents as high as 2.59% do not produce enough retained austenite to discernibly affect the quenched hardness of the tested steels.

In addition to the required minimum hardness in the mill-annealed condition, and attainable hardness in the hardened condition, for maximum utility and widest application, the steels of the invention must also possess other useful property characteristics such as high ultimate tensile strength, high yield strength, good ductility and impact strength. The effect on these properties of the relatively larger quantities of manganese and the particular balance of alloying elements used in the new steels, was determined by tests on steels of increasing manganese content and under three different heat treatment conditions. The results of such further tests are set forth in Table VII, and the Table VII data are graphically illustrated in FIGURES 20, 21 and 22.

TABLE VII

| Heat Number | Mn (percent) | S (percent) | C (percent) | Ultimate Tensile Strength (p.s.i.) | 0.2% Yield Strength (p.s.i.) | Elongation (percent) | Reduction of Area (percent) | Charpy V-Notch (ft.-lb.) | Hardness |
|---|---|---|---|---|---|---|---|---|---|
| A. Austenitized 1,800° F./1 Hr., Oil Quench, Temper 600° F./4 Hr., Air Cool ||||||||||
| 1188 | 0.36 | .33 | 0.099 | 189,900 | 163,800 | 6.0 | 32.6 | 7 | 40.5 |
| 1189 | 0.55 | .34 | 0.090 | 186,400 | 156,600 | 8.0 | 32.6 | 9 | 38.0 |
| 1233 | 0.67 | .35 | 0.101 | 197,900 | 160,200 | 11.0 | 33.8 | 11 | 36.5 |
| 1190 | 0.81 | .33 | 0.097 | 186,900 | 156,900 | 8.0 | 31.2 | 10 | 39.5 |
| 1191 | 1.02 | .34 | 0.095 | 184,400 | 151,800 | 9.0 | 29.4 | 10 | 40.5 | $R_c$
| 1234 | 1.27 | .35 | 0.113 | 191,100 | 152,400 | 10.0 | 37.4 | 11 | 38.5 |
| 1235 | 1.85 | .35 | 0.113 | 187,400 | 147,900 | 12.0 | 35.2 | 11 | 38.5 |
| 1236 | 2.59 | .34 | 0.100 | 186,900 | 147,900 | 11.0 | 37.6 | 11 | 38.5 |
| B. Austenitized 1,850° F./½ Hr., Oil Quench, Temper 1,100° F./4 Hr., Air Cool ||||||||||
| 1188 | 0.36 | .33 | 0.099 | 123,200 | 107,300 | 10.0 | 41.4 | 16 | 101.5 |
| 1189 | 0.55 | .34 | 0.090 | 123,200 | 106,900 | 13.0 | 43.2 | 15 | 97.5 |
| 1233 | 0.67 | .35 | 0.101 | 122,200 | 102,600 | 16.0 | 46.9 | 18 | 99.5 |
| 1190 | 0.81 | .33 | 0.097 | 123,200 | 107,400 | 13.0 | 40.8 | 18 | 97.0 |
| 1191 | 1.02 | .34 | 0.095 | 120,700 | 105,000 | 12.0 | 41.4 | 18 | 99.5 | $R_b$
| 1234 | 1.27 | .35 | 0.113 | 121,700 | 102,400 | 14.0 | 47.2 | 22 | 98.5 |
| 1235 | 1.85 | .35 | 0.113 | 116,200 | 97,500 | 19.0 | 49.6 | 21 | 99.0 |
| 1236 | 2.59 | .34 | 0.100 | 114,400 | 96,200 | 16.0 | 47.8 | 21 | 97.0 |
| C. Austenitized 1,850° F./½ Hr., Oil Quench, Temper 1,300° F./4 Hr., Air Cool ||||||||||
| 1233 | 0.67 | .35 | 0.101 | 95,800 | 70,700 | 26.0 | 56.1 | | 91.5 |
| 1234 | 1.27 | .35 | 0.113 | 94,600 | 68,500 | 26.0 | 56.7 | | 90.5 | $R_b$
| 1235 | 1.85 | .35 | 0.113 | 98,600 | 67,800 | 23.0 | 52.1 | | 92.5 |
| 1236 | 2.59 | .34 | 0.100 | 123,200 | 84,700 | 16.0 | 41.2 | | 99.5 |

From FIGURE 20, illustrative of tests wherein the steel samples, containing manganese from 0.36 to 2.59%, were austenitized at 1800° F. for one hour, followed by an oil quench and temper at 600° F. for four hours, then air cooled, it will be seen that the increase of manganese content does not affect the ultimate tensile strength—at manganese levels of about 1% or greater; yield strength is only slightly reduced and ductility (percent elongation and percent reduction of area) and impact strength are somewhat increased. Such effects of increased manganese contents, however, are relatively slight and do not affect the usefulness of the new steels for most purposes. FIGURE 21, illustrative of the effects of manganese upon the steels when subjected to a similar heat treatment but tempered at 1100° F., shows that at the latter temperature, a similar slight reduction of yield strength occurs as well as a slight reduction in ultimate tensile strength, particularly in the higher manganese alloys, i.e., those containing 1.85 and 2.59% manganese. Similarly, increases in ductility and impact strength are observed at the higher manganese levels.

As shown in FIGURE 22, wherein steels were similarly heat treated but tempered at 1300° F., the 2.59% manganese alloy exhibited increased tensile and yield strengths and reduced ductility. It is believed that this effect is due to the presence in such alloy of fresh martensite transformed from austenite which may have been formed during the 1300° F. temper.

Clearly, under all three conditions of heat treatment used in the Table VII and FIGURES 20-22 tests, the new steels are shown to have highly useful mechanical properties.

It is also desirable that steels of the type contemplated possess adequate corrosion resistance. The corrosion resistance of the new steels was evaluated in a series of tests wherein coupon specimens 1 inch x ½ inch x 0.080 inch were dry surface-ground to 120 grit and suspended in an elongated column about 12 inches over the surface of a water bath. The water bath was heated to a temperature of 180° F., thereby producing a moist atmosphere in the column. Heating was continued for eight hours, whereupon the heater was shut off for four hours. This cycle was repeated three times, whereupon the samples were removed and visually observed for rusting. The results of such tests are illustrated in FIGURE 23, from which it will be seen that the 0.36% manganese steel (heat No. 1188) was free of rusting, the samples of heat Nos. 1189, 1233 and 1190, containing, respectively, 0.55, 0.67 and 0.81% manganese, exhibited extensive rusting, while the samples of heat Nos. 1191, 1234, 1235 and 1236 containing, respectively, 1.02, 1.27, 1.85 and 2.59% manganese, were affected little or not at all. In particular, the 1.85 and 2.59% manganese alloys showed no discernible rusting and the 1.27% steel showed only slight rusting.

For this additional reason, therefore, the manganese content of the steels of the present invention is limited to a minimum value of about 0.80% and, preferably, to a value greater than 1.25%.

The effect of increasingly large manganese contents upon the corrosion resistance of the inventive steels when exposed to severely corrosive environments was also studied. For example, samples of the same size and preparation as used in the water vapor column test were exposed to the action of ferric chloride. A test solution was prepared consisting of 108 grams of $FeCl_3 \cdot 6H_2O$, 4.5 ml. of concentrated HCl and 995.5 ml. of water. The specimens were immersed in the test solution for four hours, the solution being maintained at room temperature.

Similar specimens were also exposed by immersion in boiling concentrated acetic acid for 48 hours.

In a still further series of tests, similar specimens were immersed in a 5 weight percent aqueous solution of sulfuric acid for four hours at room temperature.

Still further tests were conducted by immersing similar coupon samples in a 10 weight percent aqueous phosphoric acid solution for 24 hours at the boiling point of the solution.

At the conclusion of each series of tests, the samples were removed from the test solution, rinsed, dried and weighed to determine weight loss. Each series of tests included sample coupons of the Table IV alloys, i.e., heat Nos. 1188, 1189, 1233, 1190, 1191, 1234, 1235 and 1236, encompassing a manganese range of from 0.32 to 2.59%. The results of these several series of corrosion tests are graphically depicted in FIGURE 24. From Graphs A and C representing, respectively, the results of the ferric chloride and sulfuric acid tests, it will be seen that the addition of increasingly large quantities of manganese has a relatively slight effect upon the corrosion resistance of the tested steels in these media. Graph A shows that corrosion resistance is lowest at a manganese content of about 1.5%, but thereafter increases so that at a manganese level of 2.59%, the cororsion resistance of the steel is about equivalent to that of a steel containing about 0.50% manganese. Similarly, Graph C shows that the corrosion susceptibility in sulfuric acid rises to a maximum at a manganese content of about 2% and thereafter slightly decreases, but even at the maximum corrosion level, the resistance of the alloy is only slightly below that of an 0.50% manganese alloy.

Graphs B and D of FIGURE 24, representing, respectively, the results of the acetic acid and phosphoric acid tests, show that corrosion resistance of the tested alloys varies with changing manganese content. In the acetic acid environment (Graph B) corrosion resistance falls to a minimum at a manganese level of 1.2 to 1.3%, but thereafter rises so that corrosion susceptibility is at a moderate value at manganese levels of 1.8 to 2.59%.

The results of the phosphoric acid tests, illustrated by Graph D of FIGURE 24, show that corrosion resistance of the alloys in the range from about 0.70 to about 1.0% is exceptionally good, particularly at a level of about 0.80%.

Further tests in mild corrosive environments were conducted. For example, test coupons 2 inches x 1 inch x 0.080 inch were dry surface-ground to a 120 grit finish and exposed to the action of salt spray in a cabinet, the spray having a composition of 5 weight percent sodium chloride in water. The samples were exposed for a period of 16 hours at a temperature of 95° F., whereupon they were removed and visually inspected for appearance of red rust corrosion. The results of such tests are set forth in Table VIII.

TABLE VIII

| Heat Number | Wt. Percent Mn | Wt. Percent S | Visual Appearance |
|---|---|---|---|
| 1305 | 0.60 | 0.32 | Poor. |
| 1307 | 1.08 | 0.33 | Do. |
| 1309 | 1.61 | 0.31 | Do. |
| 1311 | 1.11 | 0.21 | Do. |

As will be seen from the data of Table VIII, there was no discernible difference in salt spray corrosion susceptibility among the several tested alloys encompassing a manganese range of from 0.60 to 1.61%.

Additional mild corrosive environment tests were conducted by immersing 1¼ inch x ⅝ inch x 0.080 inch, 120 grit-finished surface, test coupons for 144 hours in crude petroleum oil at a temperature of 220° F. Thereafter, the test specimens were removed and corrosion resistance evaluated by visual observation of the number of surface pits on the samples. The results of such tests are set forth in Table IX.

TABLE IX

| Heat Number | Weight Percent Mn | Weight Percent S | Number of Pits | Corrosion Resistance |
|---|---|---|---|---|
| 1305 | 0.60 | 0.32 | 8 | Good. |
| 1307 | 1.08 | 0.33 | 7 | Do. |
| 1309 | 1.61 | 0.31 | 8 | Do. |
| 1311 | 1.11 | 0.21 | 7 | Do. |

From Table IX, it will be seen that there was no discernible effect on corrosion resistance of changing manganese content from 0.60 to 1.61%.

The foregoing specific examples of the alloys of the invention comprise straight chromium stainless steels and, as indicated, the principles of the invention are equally applicable to steels having either a duplex or ferrite-free microstructure. In the case of steels containing substantially no free ferrite, the alloying elements thereof are balanced in accordance with Equation 3, as illustrated in FIGURE 7, to provide a substantially ferrite-free structure. Such steels may contain the ferrite formers chromium and molybdenum within the ranges heretofore specified. Additionally, silicon is preferably held under about 1%, and carbon plus nitrogen under about 0.20%. If used, aluminum is maintained under about 5%, preferably under 1%, copper under about 2%, and titanium under about 1%. It is to be understood that other free-machining elements, for example, selenium and tellurium, as may function analogously to sulfur, may also be utilized in the practice of the invention. If duplex steels are desired, the foregoing alloying elements may be utilized within the aforesaid ranges, in amounts and proportions productive of a microstructure with the desired ferrite content, in general accordance with Equation 3 and FIGURE 7.

The principles of the invention are also applicable to higher chromium hardenable and non-hardenable stainless steels, containing up to 18% or even 30% chromium, and carbon plus nitrogen may be present in an amount up to about 1.20%.

Nickel, which is an austenite-promoting element, may also be utilized in the alloys of the invention in relatively small amounts, e.g., up to about 3%, to provide hardenable, essentially martensitic or ferritic-martensitic stainless steels.

It is to be understood that the foregoing description and specific examples are merely illustrative of the principles of the invention and that various modifications and additions may be made without departing from the spirit and scope of the invention.

We claim:
1. A stainless steel of enhanced machinability, consisting essentially, by weight percent, of about:

| | Percent |
|---|---|
| Chromium | 11–30 |
| Carbon | $\not> 1.2$ |
| Molybdenum plus Zirconium | $\not> 0.60$ |
| Silicon | $\not> 1.0$ |
| Sulfur | 0.18–0.50 |
| Manganese | 0.80–4.0 |
| Nickel | $\not> 3.0$ |
| Iron | (1) |

[1] Balance, except for incidental impurities.

and said steel having a manganese-sulfur ratio between about 3 to 1 and about 10 to 1.

2. A heat hardenable stainless steel of enhanced machinability, consisting essentially by weight percent, of about:

| | Percent |
|---|---|
| Chromium | 11–15 |
| Carbon | $\not> 0.20$ |
| Molybdenum plus Zirconium | <0.35 |
| Silicon | $\not> 1.0$ |
| Sulfur | 0.18–0.50 |
| Manganese | 0.80–4.0 |
| Iron | (1) |

[1] Balance, except for incidental impurities.

and said steel having a manganese-sulfur ratio between about 3 to 1 and about 10 to 1.

3. A heat hardenable stainless steel of enhanced machinability, consisting essentially, by weight percent, of about:

| | Percent |
|---|---|
| Chromium | 11–15 |
| Carbon | $\not> 0.20$ |
| Silicon | $\not> 1.0$ |
| Sulfur | 0.18–0.50 |
| Manganese | 1.20–4.0 |
| Iron | (1) |

[1] Balance, except for incidental impurities.

and said steel having a manganese-sulfur ratio between about 3 to 1 and about 10 to 1.

4. A forgeable, heat hardenable stainless steel consisting essentially, by weight percent, of about:

| | Percent |
|---|---|
| Chromium | 11–15 |
| Carbon | $\not> 0.15$ |
| Silicon | $\not> 1.0$ |
| Sulfur | 0.18–0.40 |
| Manganese | 0.80–1.25 |
| Iron | (1) |

[1] Balance, except for incidental impurities.

and said steel being characterized by a drill machinability rating over about 100, and having a manganese-sulfur ratio between about 3 to 1 and about 10 to 1.

5. A forgeable, heat hardenable stainless steel of enhanced machinability consisting essentially, by weight percent, of about:

| | Percent |
|---|---|
| Chromium | 11-15 |
| Carbon | ≯0.15 |
| Silicon | ≯1.0 |
| Sulfur | 0.18-0.40 |
| Manganese | >1.25-2.5 |
| Iron | (¹) |

¹ Balance, except for incidental impurities.

wherein the manganese-sulfur ratio is between about 3 to 1 and about 10 to 1.

6. A stainless steel of enhanced free-machinability consisting essentially, by weight percent, of about:

| | Percent |
|---|---|
| Chromium | 11-15 |
| Carbon | ≯0.20 |
| Silicon | ≯1.0 |
| Sulfur | 0.35-0.50 |
| Manganese | >1.25-5.0 |
| Iron | (¹) |

¹ Balance, except for incidental impurities.

and the manganese-sulfur ratio is between about 3 to 1 and about 10 to 1.

7. A stainless steel of enhanced machinability, consisting essentially, by weight percent, of about:

| | Percent |
|---|---|
| Chromium | 15-20 |
| Carbon | ≯1.2 |
| Molybdenum+Zirconium | ≯0.60 |
| Silicon | ≯1.0 |
| Sulfur | 0.18-0.50 |
| Manganese | 0.80-4.0 |
| Nickel | ≯3.0 |
| Iron | (¹) |

¹ Balance, except for incidental impurities.

and said steel having a manganese-sulfur ratio between about 3 to 1 and 10 to 1.

References Cited

UNITED STATES PATENTS

| 1,956,645 | 5/1934 | Langenberg | 75—128 |
| 2,384,565 | 9/1945 | Schafus | 75—128 |
| 2,484,231 | 10/1949 | Kent | 75—123 |
| 2,897,078 | 7/1959 | Uishikiori | 75—124 |

HYLAND BIZOT, *Primary Examiner.*

P. WEINSTEIN, *Assistant Examiner.*